United States Patent
Kondo et al.

(10) Patent No.: US 7,221,863 B2
(45) Date of Patent: May 22, 2007

(54) IMAGE PROCESSING APPARATUS AND METHOD, AND PROGRAM AND RECORDING MEDIUM USED THEREWITH

(75) Inventors: Tetsujiro Kondo, Tokyo (JP); Kenji Tanaka, Tokyo (JP); Tsugihiko Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 11/047,751

(22) Filed: Feb. 2, 2005

(65) Prior Publication Data
US 2005/0190989 A1 Sep. 1, 2005

(30) Foreign Application Priority Data
Feb. 12, 2004 (JP) .............................. 2004-034857

(51) Int. Cl.
*G03B 15/00* (2006.01)
*G03B 41/00* (2006.01)
(52) U.S. Cl. ............................ 396/5; 396/51; 396/89; 396/147; 396/287; 396/310; 396/322; 348/218.1; 348/231.3; 348/239; 348/345
(58) Field of Classification Search ............... 396/5, 396/51, 287, 310, 311, 321, 429, 89, 147, 396/322; 348/207.1, 231.3, 218.1, 239, 333.03, 348/345
See application file for complete search history.

(56) References Cited

U.S. PATENT DOCUMENTS

| | | | |
|---|---|---|---|
| 5,218,392 A * | 6/1993 | Sakamoto et al. .......... | 396/311 |
| 7,084,910 B2 * | 8/2006 | Amerson et al. ........... | 348/239 |
| 2001/0053284 A1 * | 12/2001 | Shin .............................. | 396/5 |
| 2004/0155971 A1 * | 8/2004 | Sharma et al. .............. | 348/239 |
| 2004/0183925 A1 * | 9/2004 | Raskar et al. ............... | 348/239 |
| 2005/0018058 A1 * | 1/2005 | Aliaga et al. ............... | 348/239 |
| 2005/0128323 A1 * | 6/2005 | Choi .......................... | 348/239 |

FOREIGN PATENT DOCUMENTS

JP 2004-15106 1/2004

* cited by examiner

*Primary Examiner*—W. B. Perkey
(74) *Attorney, Agent, or Firm*—Oblon, Spivak, McClelland, Maier & Neustadt, P.C.

(57) ABSTRACT

An image processing apparatus displays a realistic image depending on a user's viewpoint. A sensor control unit 41 detects a user's viewpoint and a point of interest based on signals from various sensors, and outputs the detected viewpoint and point to a depth-of-field adjusting unit. The depth-of-field adjusting unit reads, from the image database, a depth of field set beforehand (or designated each time) and image data of images captured from different positions according to user's viewpoints, and outputs the read depth of field and data to an image combining unit. The image combining unit combines a plurality of image data items output from the depth-of-field adjusting unit and displays a combined image on a display. The present invention is applicable to a television apparatus.

12 Claims, 26 Drawing Sheets

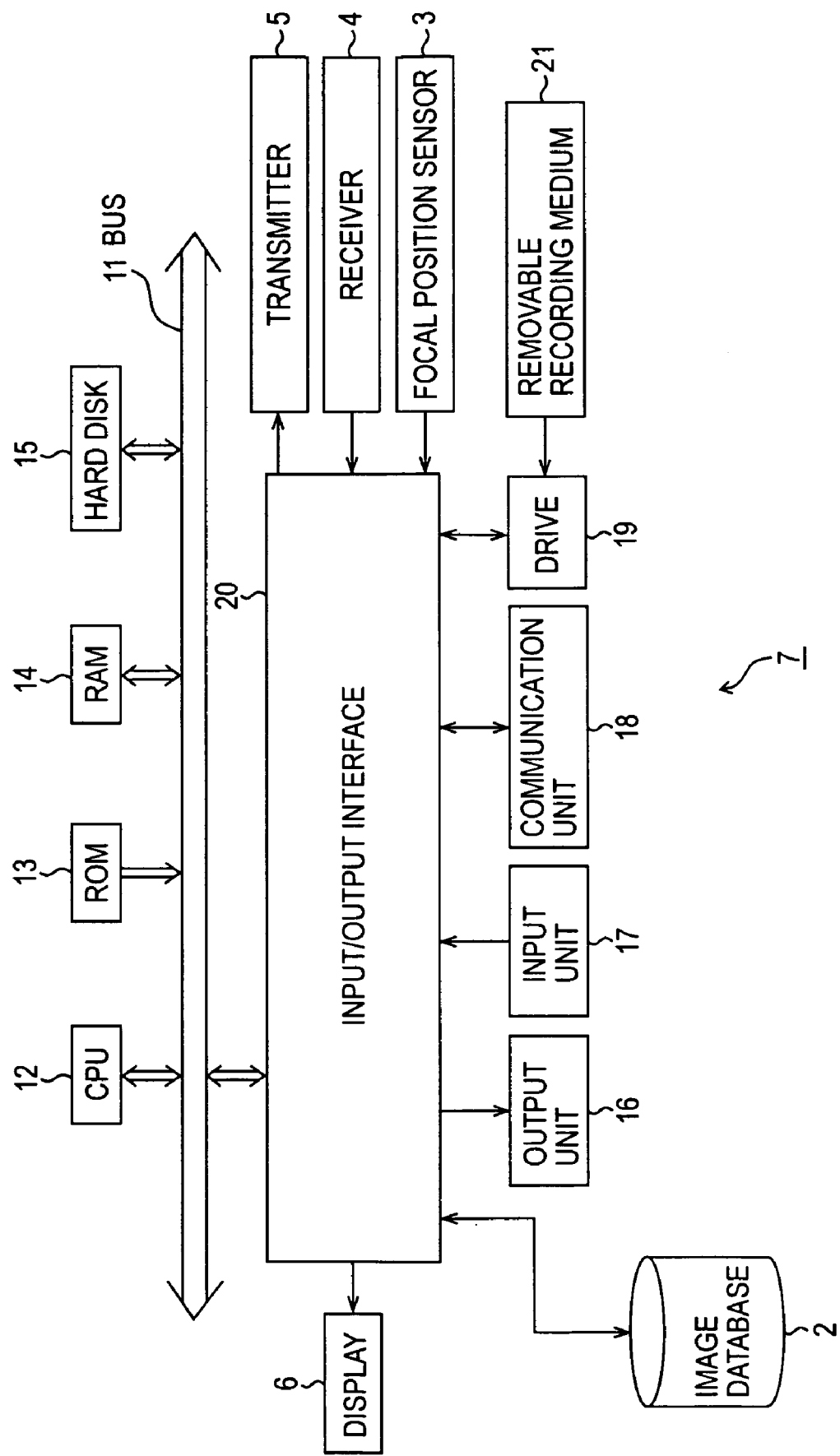

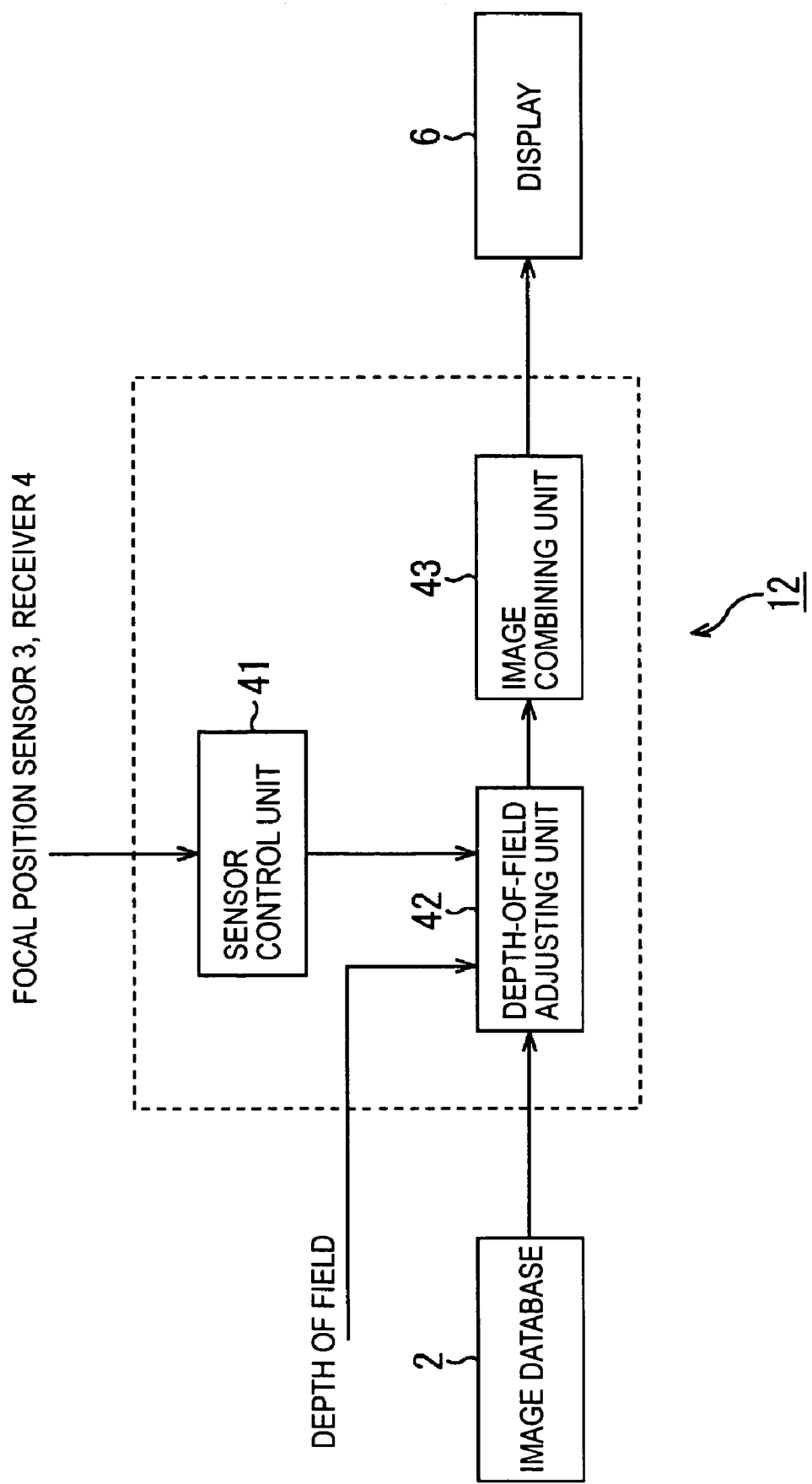

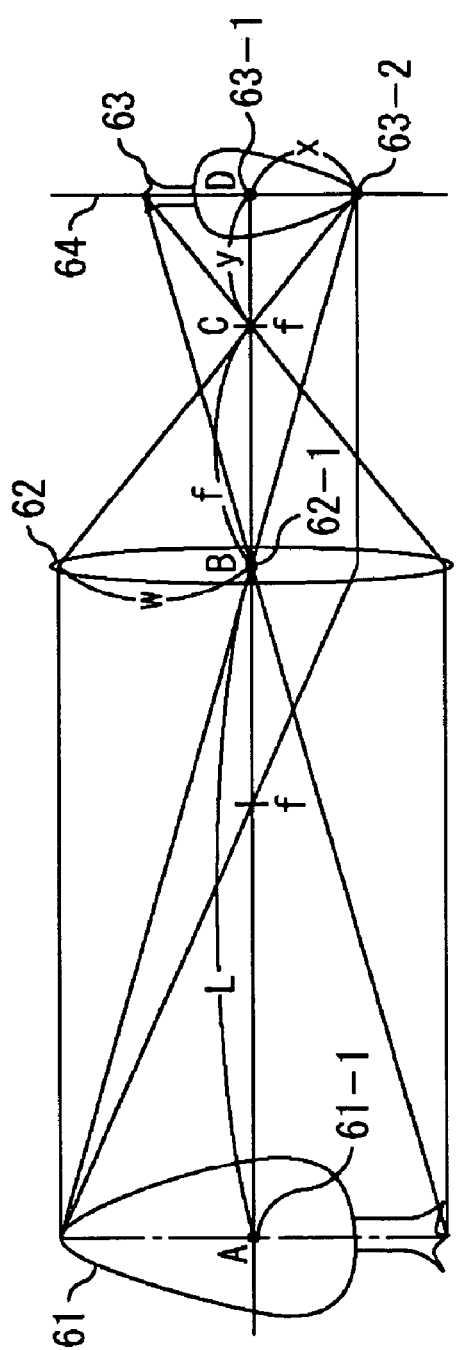
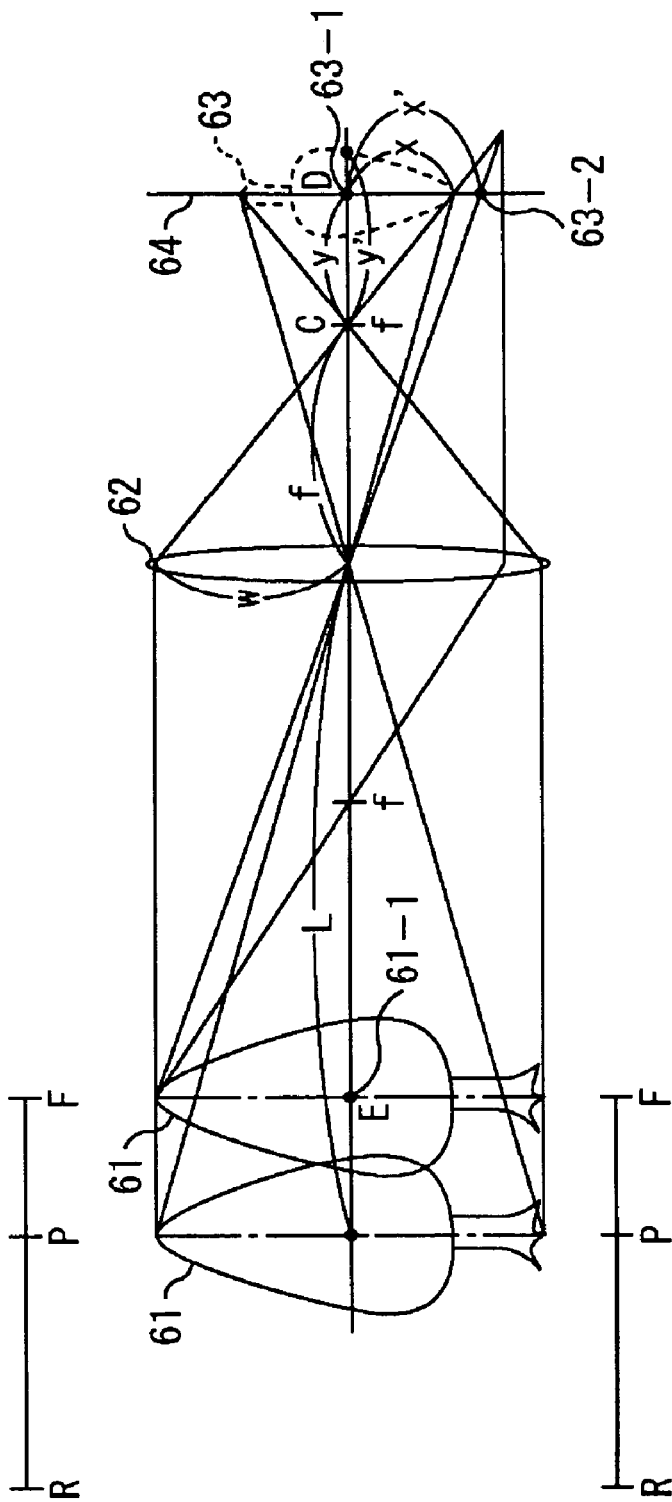
FIG. 5A
FIG. 5B

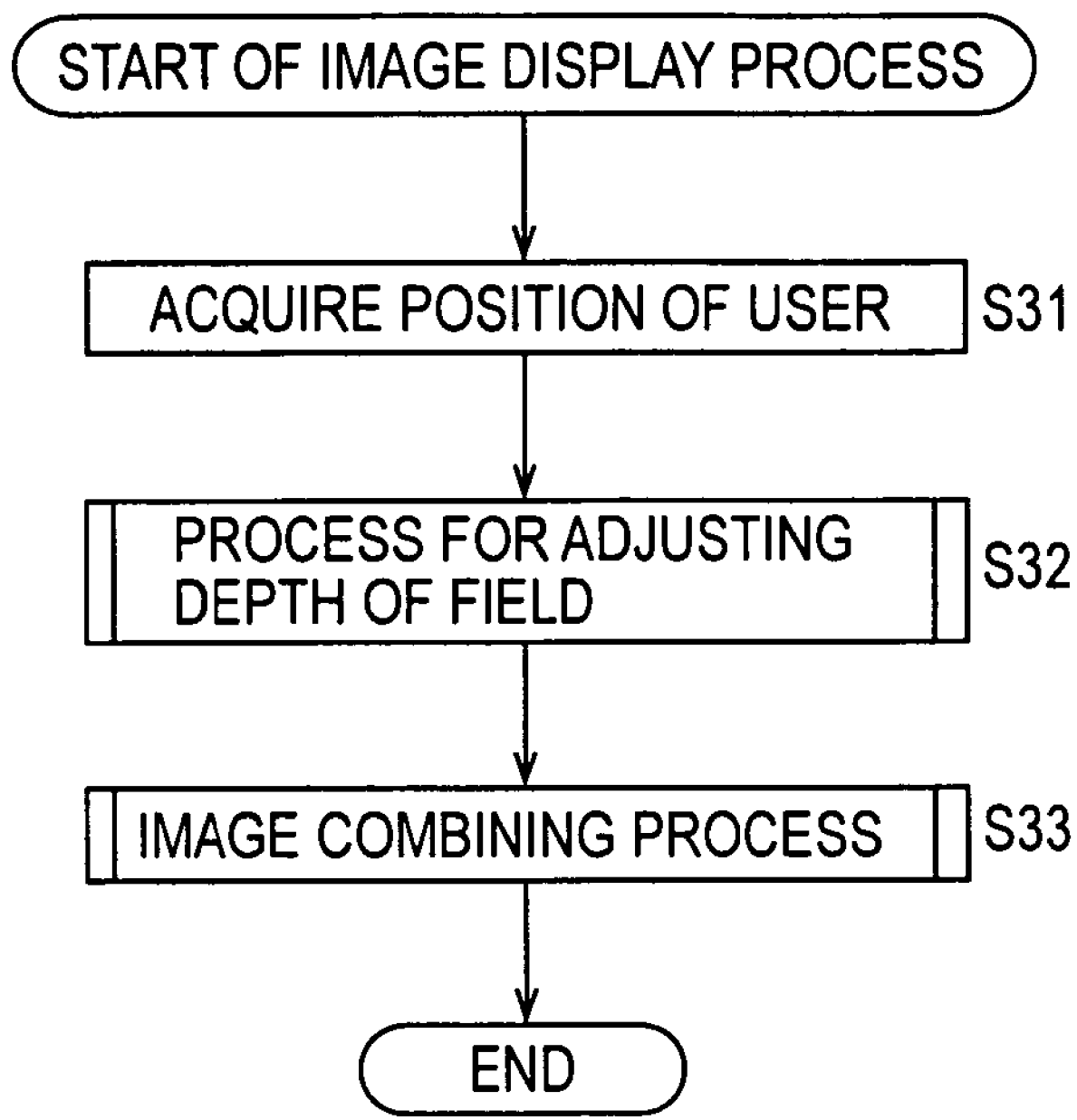

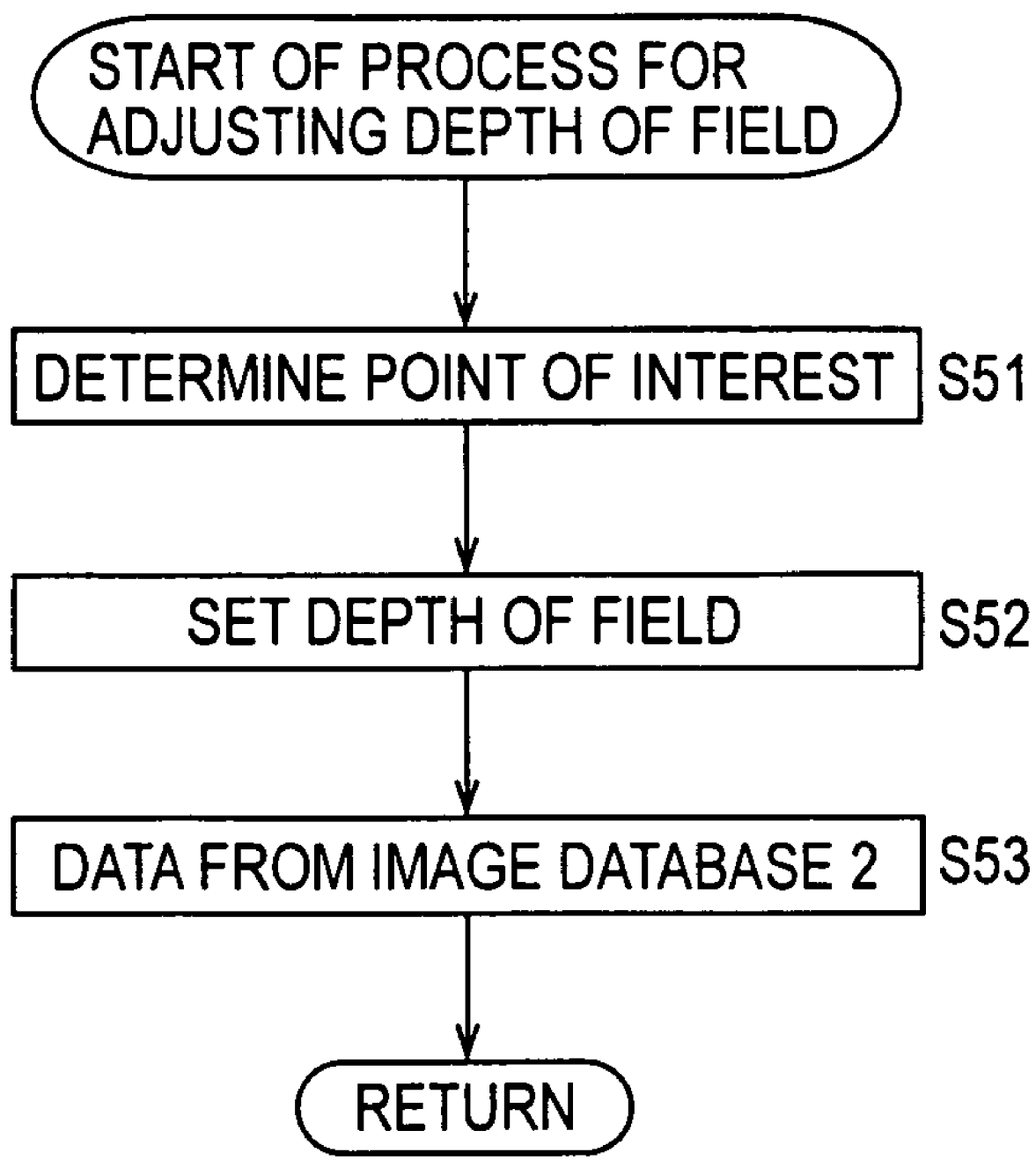

FIG. 17
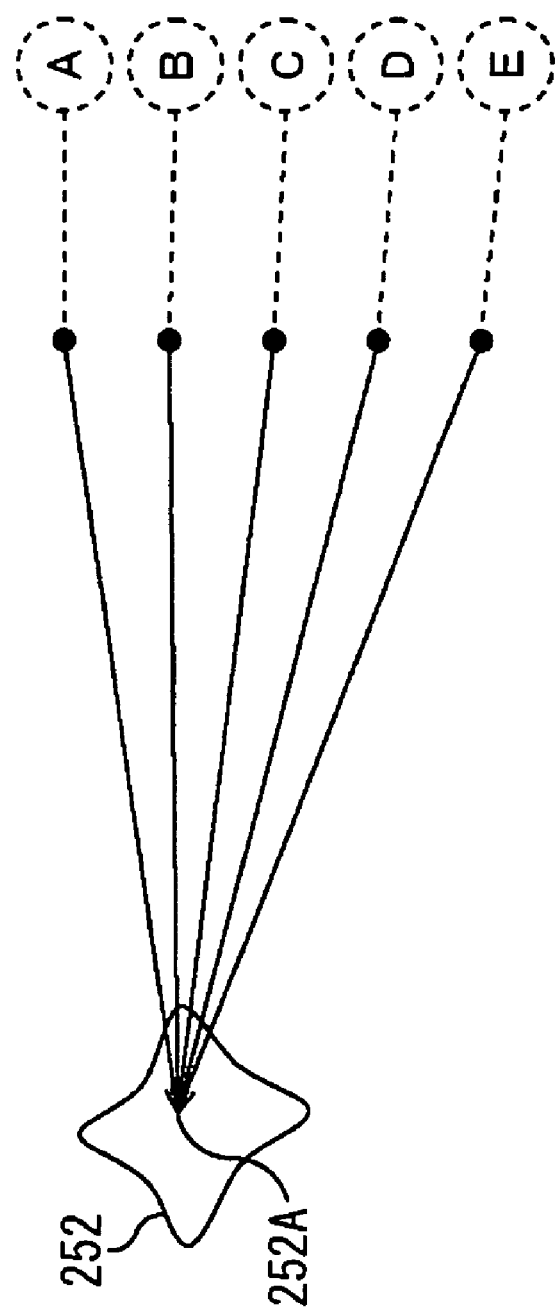

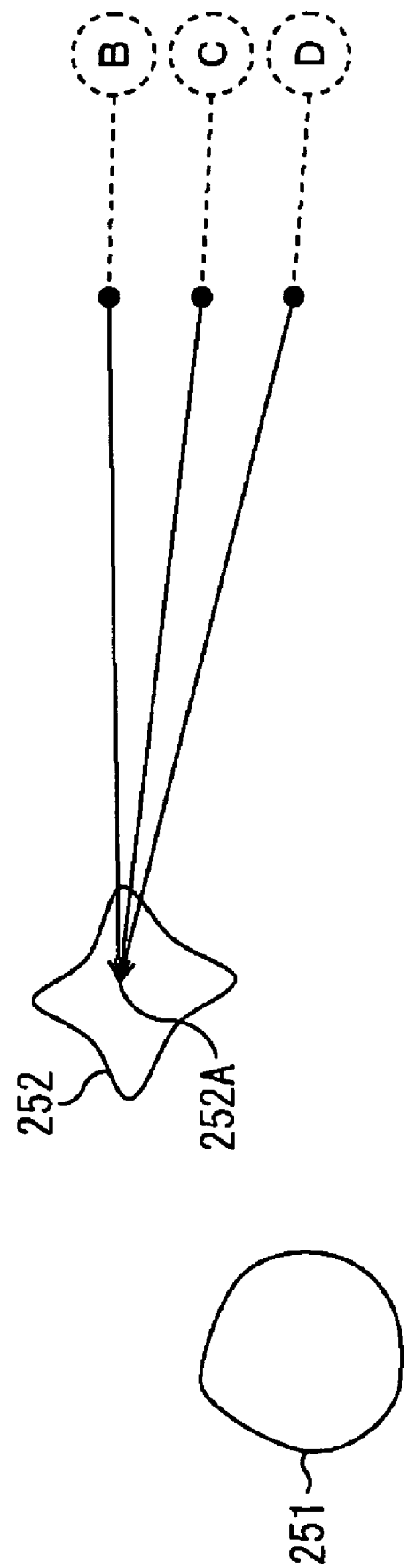

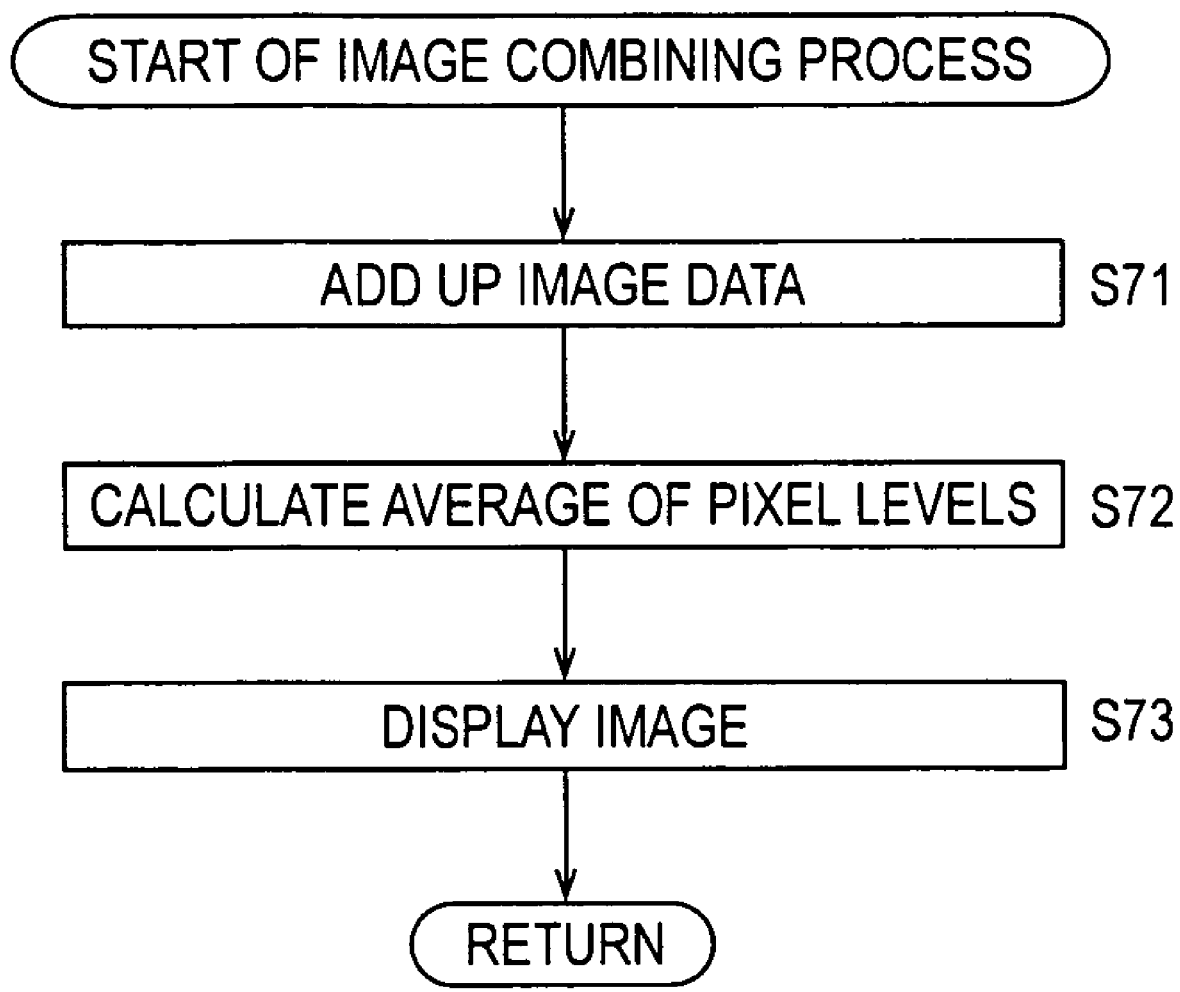

IMAGE PROCESSING APPARATUS AND METHOD, AND PROGRAM AND RECORDING MEDIUM USED THEREWITH

BACKGROUND OF THE INVENTION

1. Field of the Invention

The present invention relates to image processing apparatuses and methods, and programs and recording media used therewith, and in particular, to an image processing apparatus and method for providing a user with a more realistic image corresponding to the user's viewpoint, and to a program and recording medium used therewith.

2. Description of the Related Art

In recent years, technology that combines images obtained by digital still cameras and computer graphics (CG) has been advanced. For example, CG has become capable of performing image composition in a form controlling the depth of field of an image to be displayed. In addition, the assignee of the present invention has already proposed a technology (e.g., see Japanese Patent Application No. 2002-161838) that, depending on a user's viewpoint, provides an actually captured image viewed from that viewpoint.

However, the related art has a problem in that a realistic image cannot be composed since a resultant unnatural image is generated, such as an image showing that things positioned at different distances look clear. Also, the technology disclosed in Japanese Patent Application No. 2002-161833 causes a problem in that a realistic image cannot be provided since it is not considered which point is in focus in the field of vision of a user.

SUMMARY OF THE INVENTION

Accordingly, it is an object of the present invention to provide a realistic image corresponding to a user's viewpoint.

According to an aspect of the present invention, a first image processing apparatus for displaying an image is provided which includes a storage unit for storing image data obtained by capturing a plurality of images of a subject from a plurality of positions, together with information of the positions from which the images are captured, a viewpoint position detecting unit for detecting the position of a viewpoint of a user viewing the image, a focal position detecting unit for detecting a focal position of the viewpoint of the user, a setting unit for setting a depth of field of an image to be displayed for the user, a reading unit for reading a plurality of image data items from the storage unit based on the position of the viewpoint detected by the viewpoint position detecting unit, the focal position detected by the focal position detecting unit, and the depth of field set by the setting unit, a combining unit for combining the plurality of image data items read by the reading unit, and a display unit for displaying a combined image based on the plurality of image data items combined by the combining unit.

According to another aspect of the present invention, an image processing apparatus for displaying an image is provided which includes a storage unit configured to store a plurality of image data items obtained by capturing a plurality of images of a subject from a plurality of positions, together with information of the positions from which the images are captured, a viewpoint position detecting unit configured to detect the position of a viewpoint of a user viewing the image, a focal position detecting unit configured to set a focal position of field of the viewpoint of the user, a setting unit configured to set a depth of field of an image to be displayed for the user, a reading unit configured to read, from the storage unit, a plurality of image data items based on the position of the viewpoint detected by the viewpoint position detecting unit, the focal position detected by the focal position detecting unit, and the depth of field set by the setting unit, a combining unit configured to combine the plurality of image data items read from the reading unit, and a display unit configured to display a combined image based on the plurality of image data items combined by the combining unit.

The image data stored in the storage unit may be image data of unblurred images, and the combining unit may generate a blurred image corresponding to the depth of field set by the setting unit by combining the image data of unblurred images.

The focal position detecting unit may detect an angle of convergence based on movement of the eyes of the user, and may detect the focal position based on the detected angle of convergence.

Preferably, the smaller the depth of field is, the more number of image data items the reading unit reads from the storage unit.

According to another aspect of the present invention, a first image processing method for an image processing apparatus for displaying an image is provided. The image processing method includes the steps of storing image data obtained by capturing a plurality of images of a subject from a plurality of positions, together with information of the positions from which the images are captured, detecting the position of a viewpoint of a user viewing the image, detecting a focal position of the viewpoint of the user, setting a depth of field of an image to be displayed for the user, reading a plurality of image data items from the image data stored in the storage step based on the position of the viewpoint detected in the viewpoint position detecting step, the focal position detected in the focal position detecting step, and the depth of field set in the setting step, combining the plurality of image data items read in the reading step, and displaying a combined image based on the plurality of image data items combined in the combining step.

According to another aspect of the present invention, a first computer program for an image processing apparatus for displaying an image is provided which includes the steps of controlling detection of the position of a viewpoint of a user viewing the image, controlling detection of a focal position of the viewpoint of the user, controlling setting of a depth of field of an image to be displayed for the user, controlling reading so that, based on the viewpoint detected in the viewpoint-position-detection control step, the focal position detected in the focal-position-detection control step, and the depth of field set in the setting control step, a plurality of image data items are read from image data obtained by capturing images of a subject from a plurality of positions, the image data being stored together with information of the positions from which the images are captured, controlling combining of the plurality of image data items read in the reading control step, and controlling display of a combined image based on the plurality of image data items combined in the combining control step.

According to another aspect of the present invention, a first recording medium having thereon a recorded program for an image processing apparatus for displaying an image is provided. The program includes the steps of controlling detection of the position of a viewpoint of a user viewing the image, controlling detection of a focal position of the viewpoint of the user, controlling setting of a depth of field of an image to be displayed for the user, controlling reading so that, based on the viewpoint detected in the viewpoint-position-detection control step, the focal position detected in the focal-position-detection control step, and the depth of field set in the setting control step, a plurality of image data items are read from image data obtained by capturing images of a subject from a plurality of positions, the image data being stored together with information of the positions from which the images are captured, controlling combining of the plurality of image data items read in the reading control step, and controlling display of a combined image based on the plurality of image data items combined in the combining control step.

According to the first image processing apparatus and method, and program of the present invention, image data obtained by capturing a plurality of images from a plurality of positions is stored together with information of the positions from which the images are captured. Based on the position and focal position of a viewpoint of a user viewing an image, and a depth of field of an image to be displayed for the user, a plurality of image data items is read from the stored image data. The read image data items are combined and a combined image is displayed.

According to another aspect of the present invention, a second image processing apparatus is provided which includes a moving unit for moving a subject, an image capturing unit for capturing an image of the subject moved by the moving unit, and an output unit for outputting image data of the image captured by the image capturing unit and information of the position of the subject moved by the moving unit in a form in which the image data and the information are associated with each other.

According to another aspect of the present invention, an image processing apparatus is provided which includes a moving unit configured to move a subject, an image capturing unit configured to capture an image of the subject moved by the moving unit, and an output unit configured to output image data of the image captured by the image capturing unit and information of the position of the subject moved by the moving unit in a form in which the image data and the information are associated with each other.

The moving unit may move the subject in units of predetermined distances, and, whenever the moving unit moves the subject, the image capturing unit captures images of the subject from a plurality of positions.

According to another aspect of the present invention, a second image processing method is provided which includes the steps of moving a subject, capturing an image of the subject moved in the moving step, and outputting image data of the image captured in the image capturing step and information of the position of the subject moved in the moving step in a form in which the image data and the information are associated with each other.

According to another aspect of the present invention, a program to be executed by a computer is provided. The program includes the steps of controlling movement of a subject, controlling capturing of an image of the subject moved in the movement control step, and controlling output so that image data of the image captured in the image capturing control step and information of the position of the subject moved in the movement control step are output in a form in which the image data and the information are associated with each other.

According to another aspect of the present invention, a second recording medium having thereon a recorded program to be executed by a computer is provided. The program includes the steps of controlling movement of a subject, controlling capturing of an image of the subject moved in the movement control step, and controlling output so that image data of the image captured in the image capturing control step and information of the position of the subject moved in the movement control step are output in a form in which the image data and the information are associated with each other.

According to the second image processing apparatus and method, and program, images of a subject are captured while moving the subject. Image data of the captured images and information of the position of the subject are output in a form in which both are associated with each other.

BRIEF DESCRIPTION OF THE DRAWINGS

FIG. 2 is a block diagram showing an example of the configuration of the computer shown in FIG. 1;

FIG. 4 is a block diagram showing an example of the functional configuration of the CPU shown in FIG. 4;

FIGS. 5A and 5B are illustrations of a depth of field and image blur;

FIG. 12 is a flowchart illustrating an image display process;

FIG. 13 is a flowchart illustrating a process for adjusting a depth of field;

FIG. 17 is a plan view illustrating the plural image capturing positions required for generating a combined image having a depth of field;

FIG. 19 is a plan view illustrating the plural image capturing positions required for generating a combined image having a depth of field;

FIG. 20 is a flowchart illustrating an image combining process;

DESCRIPTION OF THE PREFERRED EMBODIMENTS

Embodiments of the present invention are described below with reference to the accompanying drawings.

Figure 1:
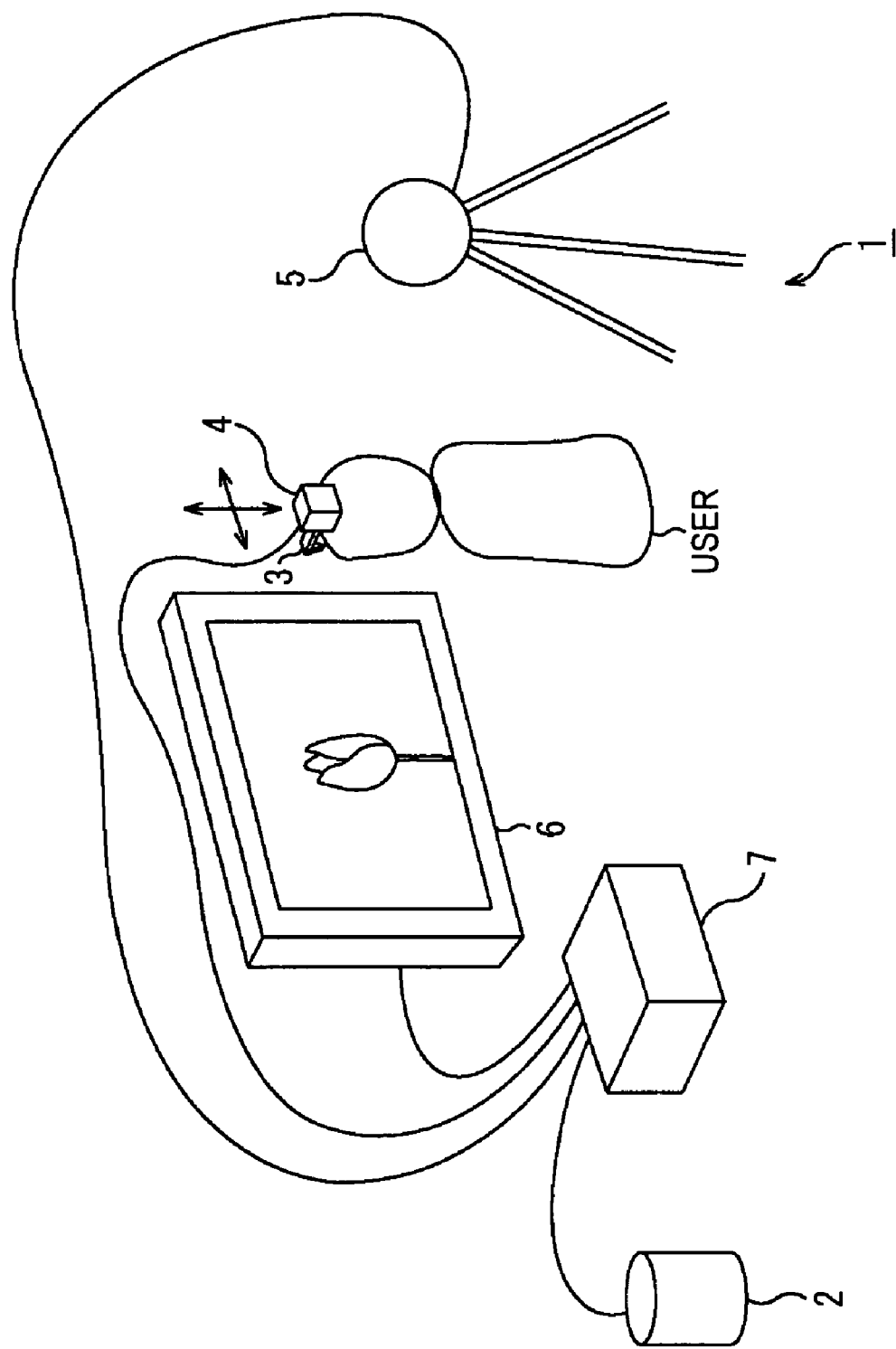
FIG. 1 is a block diagram showing an example of the configuration of an image processing apparatus of the present invention.

FIG. 1 shows an example of the configuration of an image processing apparatus 1 according to an embodiment of the present invention. In the image processing apparatus 1, a computer 7 is, for example, a workstation. The computer 7 controls a receiver 4 and a transmitter 5, which constitute a position sensor, to detect the position (if necessary, also the orientation) of a user based on an output from the receiver 4. Based on an output from a focal position sensor 3, the computer 7 detects a focal position corresponding to a line of sight of the user.

The computer 7 sets the user's position based on the output from the receiver 4, as a user's viewpoint, and converts image data stored in an image database 2 into display image data by combining the image data based on the focal point corresponding to the line of sight of the user and the position of the user's viewpoint. The computer 7 supplies and displays the display image data on a display 6.

As described later with reference to FIGS. 7 to 9, the image database 2 stores image data of images captured from plural positions. The image data is obtained by an image data generating apparatus including an image capturing device such as a camera.

The focal position sensor 3 is attached to the user. The focal position sensor 3 detects a position of interest (focal position) corresponding to the line of sight of the user by detecting movement of the user's eyes and calculating an angle of convergence, which is described later with reference to FIG. 14.

The receiver 4 is attached to the user. The receiver 4 detects a magnetic field generated by the transmitter 5 and supplies the magnetic intensity to the computer 7. Under the control of the computer 7, the transmitter 5 generates the magnetic field. In other words, in the embodiment shown in FIG. 1, the receiver 4 and the transmitter 5 constitute a magnetic field sensor serving as a position sensor. By measuring the intensity of the magnetic field generated by the transmitter 5, the receiver 4 can detect its position, that is, the position of the user.

The focal position sensor 3 and the receiver 4 are attached to, for example, the head of the user. If the user wears eyeglasses, the focal position sensor 3 and the receiver 4 are mounted to frames of the eyeglasses.

As the position sensor, not only the magnetic sensor but also a mechanical link position measuring device (e.g., a three-dimensional digitizer, etc.) can be employed. In addition, a device that can input a change in position of the user, such as a joystick or a trackball, can be employed as the position sensor. In other words, the position sensor does not need to be a device that detects an actual position of the user, but may be a device that can input a virtual position of the user.

The display 6 is formed by, for example, a cathode-ray tube (CRT) or a liquid crystal display (LCD), and displays display image data supplied from the computer 7. In addition to the CRT and LCD, for example, a projector, a head mounted display (HMD), and other devices that can display images can be employed as the display 6.

FIG. 2 is a block diagram showing an example of the hardware of the computer 7 shown in FIG. 1.

The computer 7 has a built-in central processing unit (CPU) 12. An input/output interface 20 is connected to the CPU 12 by a bus 11. By operating an input unit 17, including a keyboard, a mouse, and a microphone, to input an instruction to the CPU 12, the CPU 12 executes a program stored in a read-only memory (ROM) 13. Alternatively, the CPU 12 executes a program after loading the program into a random access memory (RAM) 14. The program is one of a program stored in a hard disk 15, a program installed into the hard disk 15 after being transmitted from a satellite or network (not shown) and being received by a communication unit 18, and a program installed into the hard disk 15 after being read from a removable recording medium 21 when it is loaded into a drive 19.

The CPU 12 outputs various types of processing results from an output unit 16 formed by a speaker or the like, transmits the results from the communication unit 18, or records the results on the hard disk 15, if necessary, through, for example, the input/output interface 20.

In the example shown in FIG. 2, the input/output interface 20 connects to the image database 2, the focal position sensor 3, the receiver 4, the transmitter 5, and the display 6. The CPU 12 reads the image data stored in the image database 2 through the input/output interface 20. The CPU 12 uses the input/output interface 20 to perform acquiring an output signal of the focal position sensor 3 to detect a focal point, controlling the transmitter 5, and receiving the output of the receiver 4 to detect the position of the user.

In addition, the CPU 12 sets the detected position of the user as the user's viewpoint, and combines the read image data, based on the detected focal position and user's viewpoint, to generate display image data of a display image having a predetermined depth of field. The CPU 12 controls the display 6 to display the display image by using the input/output interface 20 to supply the display image data. The depth of field may be set beforehand and may be designated by the user through the input unit 17.

Figure 3A:
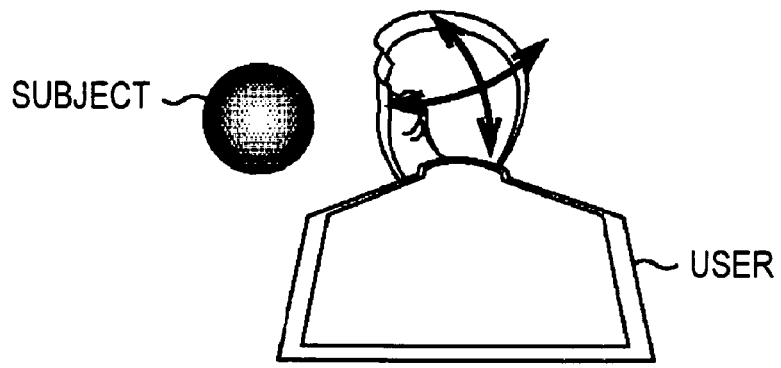
FIGS. 3A, 3B, and 3C are illustrations of images viewed from a user's viewpoint.

In the image processing apparatus 1 in FIG. 1, which has a configuration formed by the computer 7 shown in FIG. 2, as shown in, for example, FIG. 3A, the display 6 displays an image, based on display image data, showing that, in the actual world, the user observes a certain subject.

In other words, in a case in which the user observes a subject in the actual world, when the user moves the viewpoint, the user can observe the subject from the moved viewpoint. Specifically, in the actual world, by moving the viewpoint, a visible portion and invisible portion of the subject change.

Figure 3B:
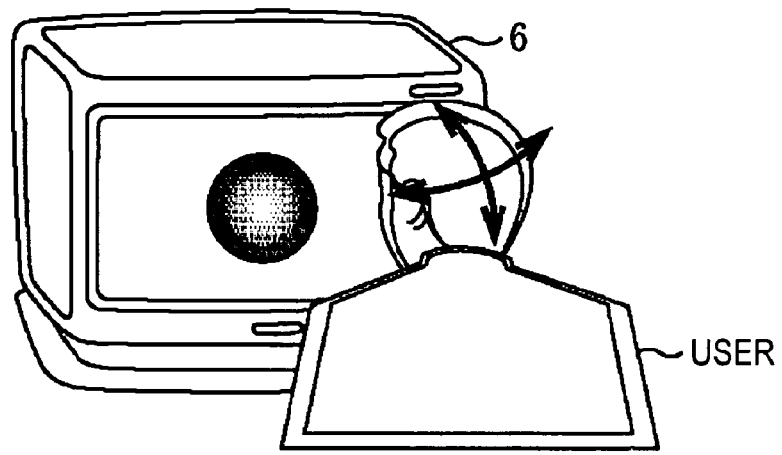
Figure 3C:
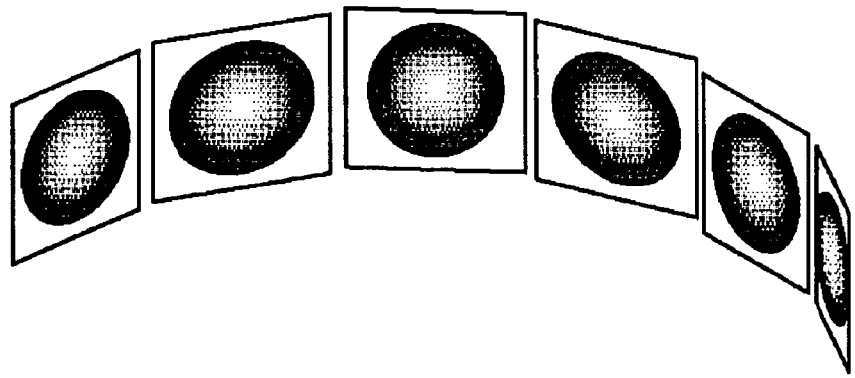

In the image processing apparatus 1 in FIG. 1, as shown in FIG. 3B, when the user moves the viewpoint, the image displayed on the display 6 changes depending on the viewpoint so as to show the subject in form recognized by the sense of vision of the user in the actual world. In other words, as shown in FIG. 3C, in the image processing apparatus 1 in FIG. 1, when the user moves the viewpoint, images viewed from the moved viewpoints can be displayed.

Therefore, in the image processing apparatus 1 in FIG. 1, when the user moves the viewpoint, the display 6 displays an image showing a state in which an invisible portion of the subject from the viewpoint before it is moved is visible. In other words, when the user moves the viewpoint so as to look into the subject displayed on the display 6, the display 6 displays an image similar to that visually recognized when, in the actual world, the subject is viewed from the moved viewpoint, that is, an image showing a state in which a portion of the subject is visible from a direction in which the user looks into the subject. Accordingly, it may be said that the image processing apparatus 1 in FIG. 1 is a so-called "television that can be looked into".

FIG. 4 is a block diagram showing an example of the functional configuration of the CPU 12 shown in FIG. 2. In this example, the bus 11 and the input/output interface 20 are not shown. A sensor control unit 41 acquires signals output from the focal position sensor 3 and the receiver 4 to detect the focal point of the line of sight of the user and the position of the user, and outputs information of the detected focal point and information of the detected position of the user to a depth-of-field adjusting unit 42.

Based on the information of the focal point and information of the position of the user which are supplied from the sensor control unit 41, the depth-of-field adjusting unit 42 acquires, from the image database 2, image data items corresponding to user's viewpoints and outputs the acquired image data items to an image combining unit 43.

The image combining unit 43 combines the image data items output from the depth-of-field adjusting unit 42 to generate display image data of an image which has a predetermined depth of field and which is to be displayed for the user.

An image based on the displayed image data generated by the image combining unit 43 is output to the display 6.

A depth of field of an image is described with reference to FIGS. 5A and 5B. Referring to FIG. 5A, a subject 61 (tree in this example) is photographed through a lens 62 to be focused to generate an image 63 of the subject 61. The center point 61-1 of the subject 61, the center point 62-1 of the lens 62, and the center point 63-1 of the image 63 are collinearly disposed in the horizontal direction in FIG. 5A. The position of the center point 61-1 of the subject 61, the position of the center point 62-1 of the lens 62, and the position of the center point 63-1 of the image 63 are indicated by reference letters A, B, and D, respectively, in FIG. 5A. The effective aperture of the lens 62 is represented by reference letter W, and the focal distance of the lens 62 is represented by reference letter f.

In this example, the image 63 is focused so that its center point 63-1 is on a point D at a distance y from the focus C of the lens 62. By installing a screen 64 on the point D, the image 63 can be displayed as an unblurred image. Then, the distance from the center point 63-1 to a vertex 63-2 of the image 63 is represented by x.

As shown in FIG. 5B, when the center point 61-1 of the subject 61 moves to a point E so as to approach the lens 62, the image 63 is focused so that its center point 63-1 is on a point at a distance y' from a point C indicating the focal position of the lens 62. When the screen 64 is installed on the position of the point D, the distance from the center point 63-1 to vertex 63-2 of the image 63 changes to a distance x', and a point on the screen 64 becomes a circle having a radius represented by x–x'. As a result, the image 63 displayed on the screen 64 becomes an image out of focus (blurred image). In this case, when the radius x–x' is in an ignorable range that does not cause visual deterioration, it may be said that the subject 61 is in an appropriate depth of field. Conversely, when the radius x–x' is not in the ignorable range, it may be said that the subject 61 is not in the appropriate depth of field.

A cause of occurrence of the image blur is that a lens aperture is not a small pinhole but has a certain amount of diameter. Image capturing by using a pinhole lens produces a pan-focus image in which all points, that is, points near the lens to points far from the lens, are visually in focus (i.e., a large depth of field). In general, an image captured by a digital still camera has a large depth of field and is close to a pan-focus image. Conversely, in many cases, an image captured by a camera with a zoom lens and an image observed by human eyes have predetermined (relatively small) depths of field. In other words, it may be said that an image having a small depth of field is more natural (realistic) image for human. Accordingly, an image processing apparatus of the present invention generates a blurred image, that is, an image having a predetermined depth of field, by also adding a pan-focus image captured through a pinhole lens.

Next, an image data generating apparatus 80 that generate image data which is stored in the image database 2, and its operation are described below with reference to FIGS. 6 to 9.

Figure 6:
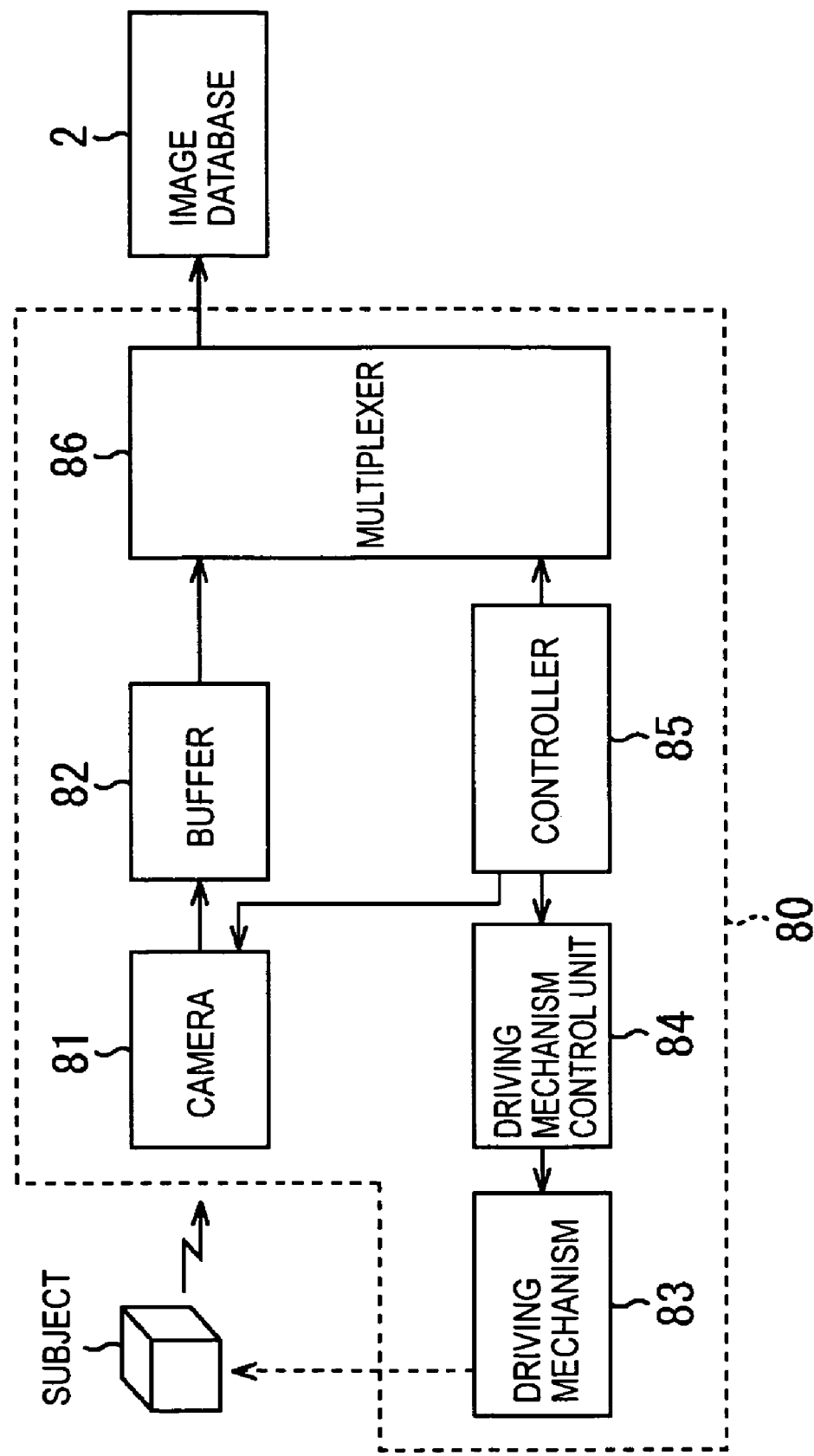
FIG. 6 is a block diagram showing an image data generating apparatus.

FIG. 6 is a block diagram showing an example of the configuration of the image data generating apparatus 80. Under the control of a controller 85, a camera 81 captures an image of a subject and outputs captured image data to a buffer 82. The lens aperture of the camera 81 is sufficiently small, and the camera 81 captures an image close to a pan-focus image. Since an image becomes darker as the lens aperture is smaller, the subject is illuminated with a sufficient amount of light. The controller 85 controls a driving mechanism control unit 84 to drive a driving mechanism 83, and the driving mechanism 83 moves the subject in units of predetermined distances (or angles). The controller 85 outputs, to a multiplexer 86, driving information indicating to which position the subject image has been moved.

The multiplexer 86 outputs the image output by the buffer 82 and the driving information output by the controller 85 to the image database 2 in a form in which both are associated with each other.

Figure 7:
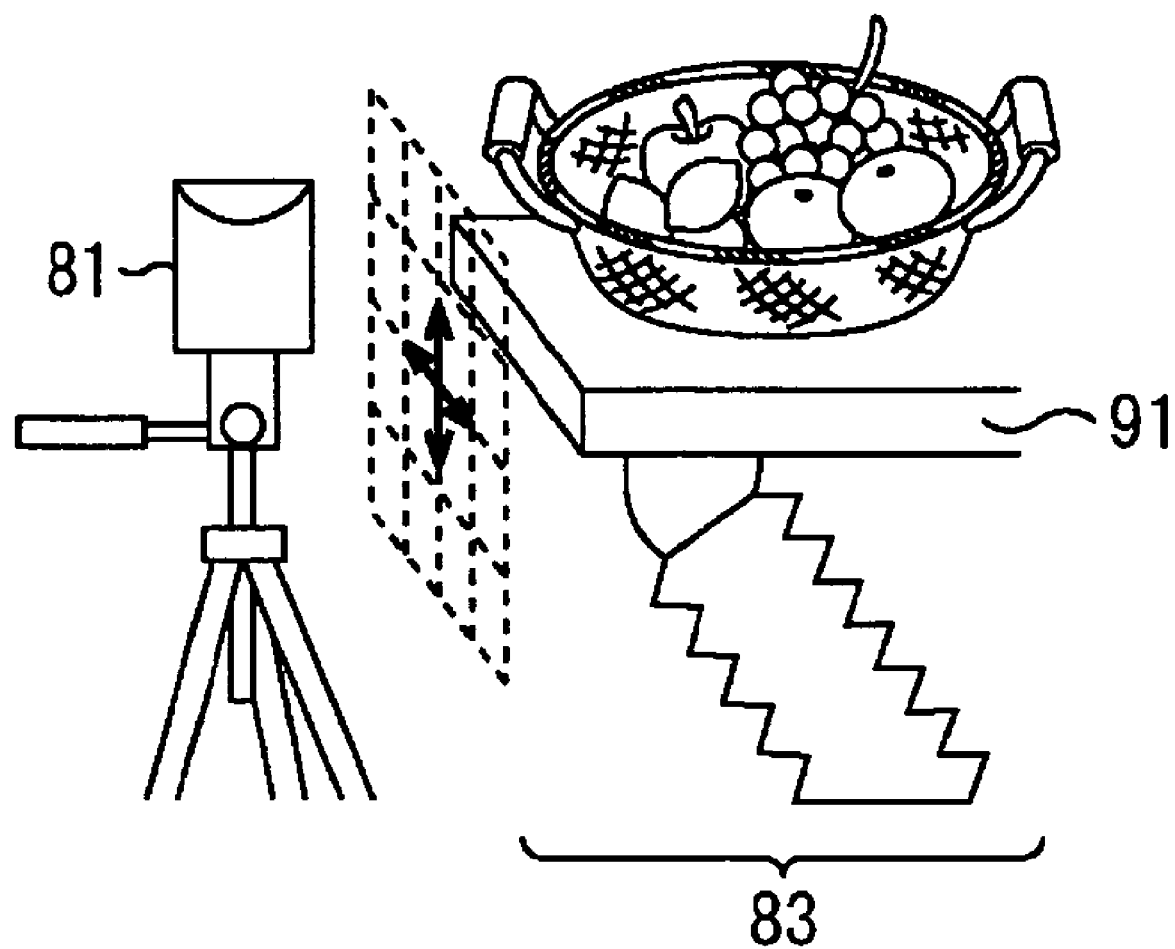
FIG. 7 is an illustration of an example of the configuration of the driving mechanism shown in FIG. 6.

FIG. 7 shows an example of the configuration of the driving mechanism 83. In this example, the driving mechanism 83 is formed so that a table on which a subject is placed can be moved vertically, horizontally, and back and forth at predetermined intervals (e.g., 10 cm). The camera 81 captures an image of the subject each time at a position at which the driving mechanism 83 is stopped.

Figure 8:
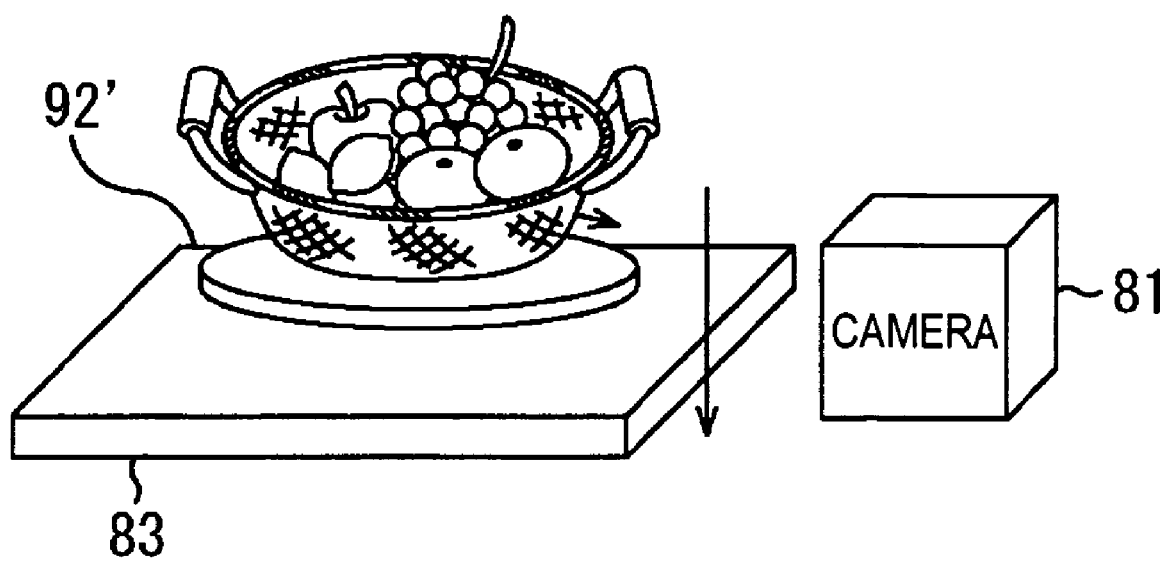
FIG. 8 is an illustration of another example of the driving mechanism shown in FIG. 6.
Figure 9:
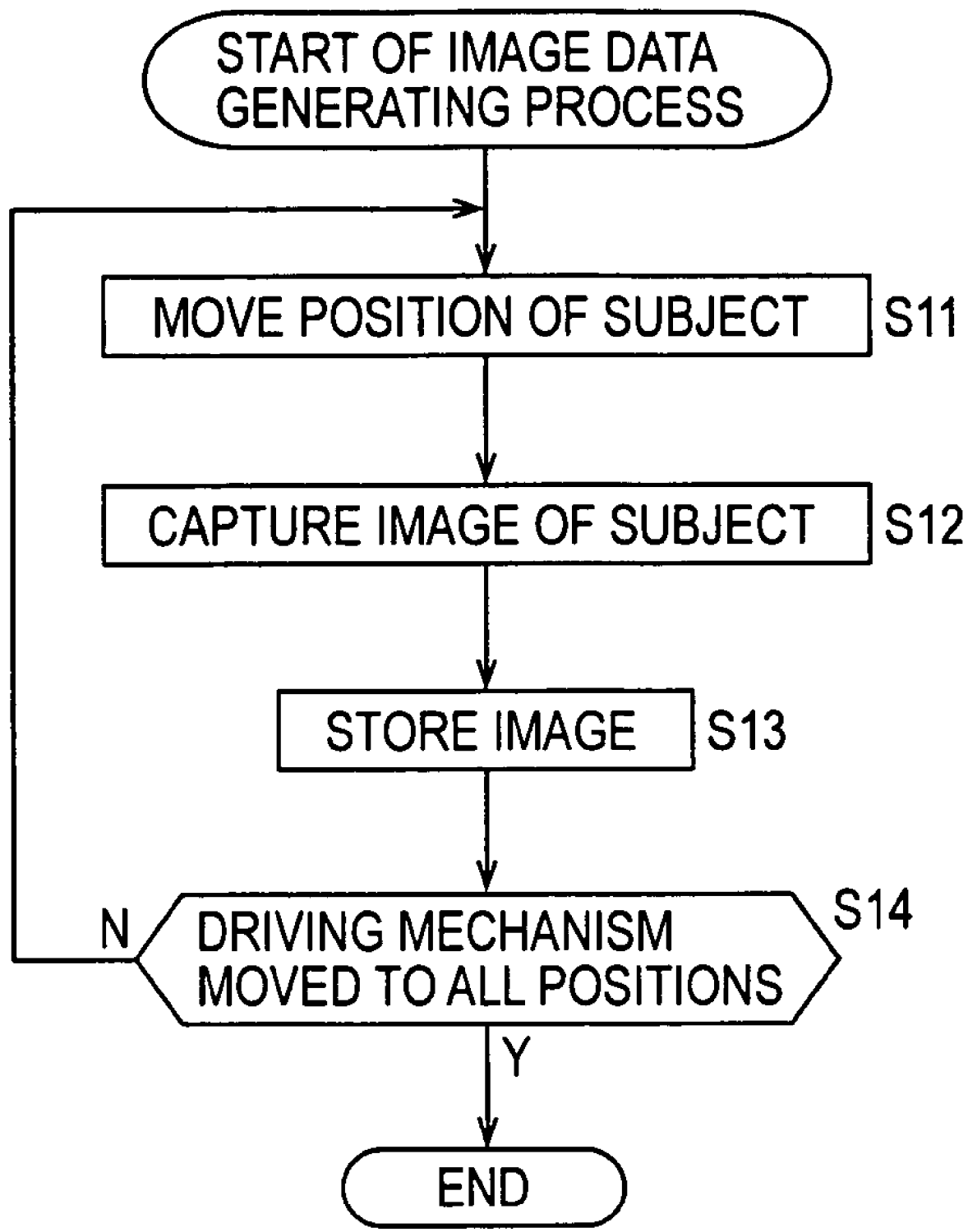
FIG. 9 is a flowchart illustrating an image generating process.

FIG. 8 shows another example configuration of the driving mechanism 83. In this example, the driving mechanism 83 is formed so that a table 92 on which a subject is placed can be rotated at predetermined intervals (e.g., 30 degrees) and can be moved with respect to the camera 81 at predetermined intervals (e.g., 10 cm). The camera 81 captures an image of the subject each time at a position at which the driving mechanism 83 is stopped. A combination of the examples in FIGS. 7 and 8 may form the driving mechanism 83.

In the above examples, the image data generating apparatus 80 is configured to perform image capturing while using the driving mechanism 83 to move the subject. The image data generating apparatus 80 may be configured to perform image capturing while using the driving mechanism 83 to move the camera 81. In other words, the subject is relatively moved with respect to the camera 81.

Next, an image data generating process of the image data generating apparatus 80 shown in FIG. 6 is described below with reference to FIG. 9.

In step S11, the controller 85 controls the driving mechanism control unit 84 to move the position of a subject. In step S12, the controller 85 controls the camera 81 to capture an image of the subject.

In step S13, the multiplexer 86 stores, in the image database 2, the image data supplied by the camera 81 through the buffer 82 and the driving information (information of a position from which the subject is photographed) supplied by the controller 85 in a form in which both are associated with each other.

In step S14, the controller 85 determines whether the driving mechanism 83 has been moved to all predetermined positions to which it is scheduled to move. If it is determined that the driving mechanism 83 has not been moved to all the predetermined positions, the process returns to step S11 and repeatedly executes the subsequent steps. If, in step S14, it is determined that the driving mechanism 83 has been moved to all the predetermined positions, the process ends.

As described above, image data of pan-focus images captured from all scheduled directions (all the positions to which the driving mechanism 83 are moved) is generated and stored. The image data is stored in the image database 2 together with information of positions from which the subject is photographed. This processing is performed for an arbitrary number of subjects. Accordingly, regarding an arbitrary subject, image data of images captured from desired positions can be easily read by the computer 7. The image data generated by the image data generating apparatus 80 in the present invention is still image data.

In the above examples, actual image capturing generates image data. However, by using CG or the like to generate image data items which are identical to those obtained when moving the driving mechanism 83, the generated image data items may be stored in the image database 2 together with related driving information. In this case, a camera, a screen, etc., are given in virtual form on calculation.

Figure 10:
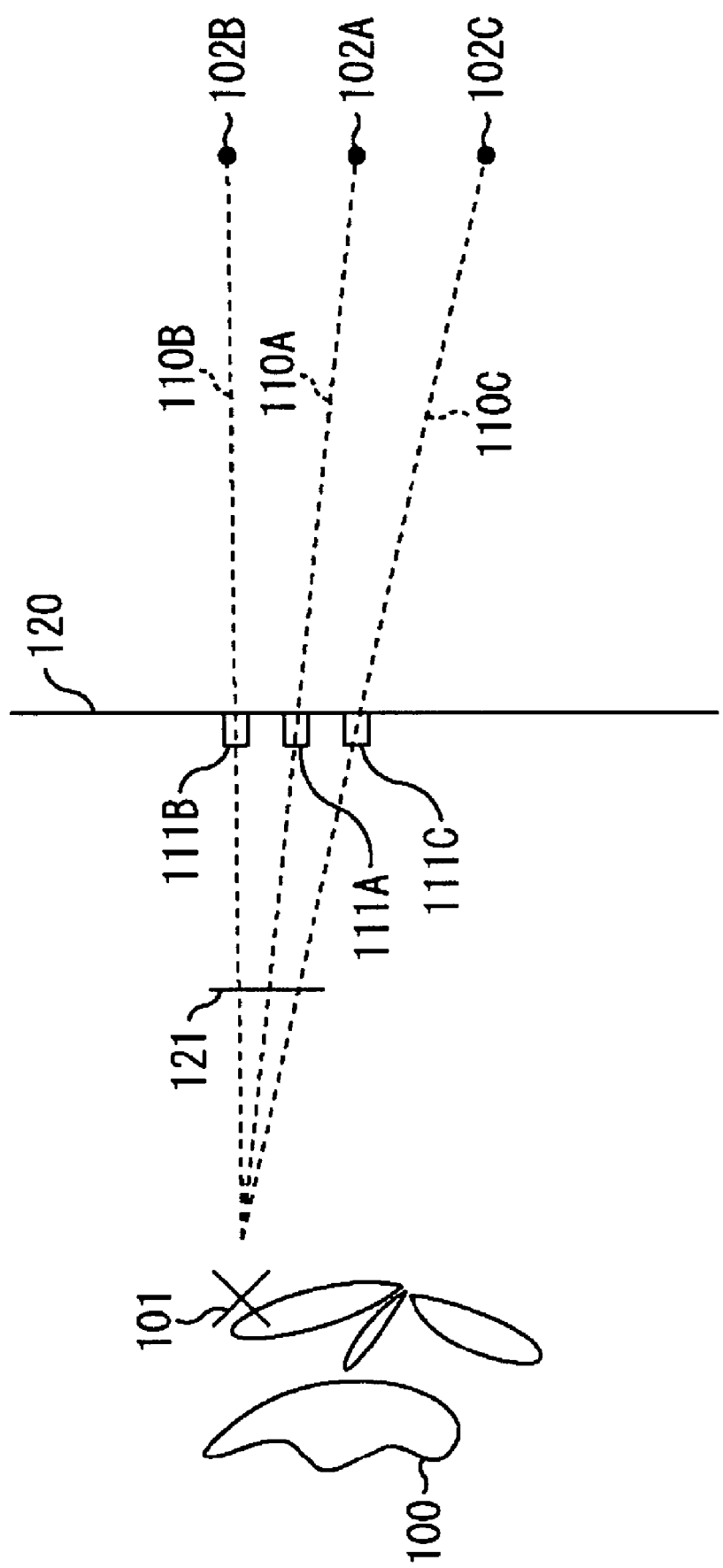
FIG. 10 is a plan view illustrating a relationship between a user's viewpoint and an image to be captured.

As described above, the generated and stored image data is displayed as shown in, for example, FIG. 10. The user observes an image displayed on a screen 120 from the right side of the screen 120 in FIG. 10.

When a user's viewpoint 102A and a point of interest 101 on a subject 100 are given, a point at which a straight line 110A connecting the point of interest 101 and the user's viewpoint 102A intersects with the screen 120 is represented by a camera position 111A. An image captured from a position corresponding to the camera position 111A is acquired as an image displayed on a virtual screen 121. By displaying this image onto the screen 120 as an image viewed from the user's viewpoint 102A, a pan-focus image is displayed.

When a blurred image having a depth of field is displayed, by setting other viewpoints (e.g., viewpoints 102B and 102C) in the vicinity of the user's viewpoint 102A, using, as camera position 111B and 111C, positions at which straight lines 110B and 110C connecting the point of interest 101 and the viewpoints 102B and 102C, and combining images captured from positions corresponding to the camera positions 111B and 111C and the image captured from a position corresponding to the position 111A, the resultant image may be displayed.

Figure 11:
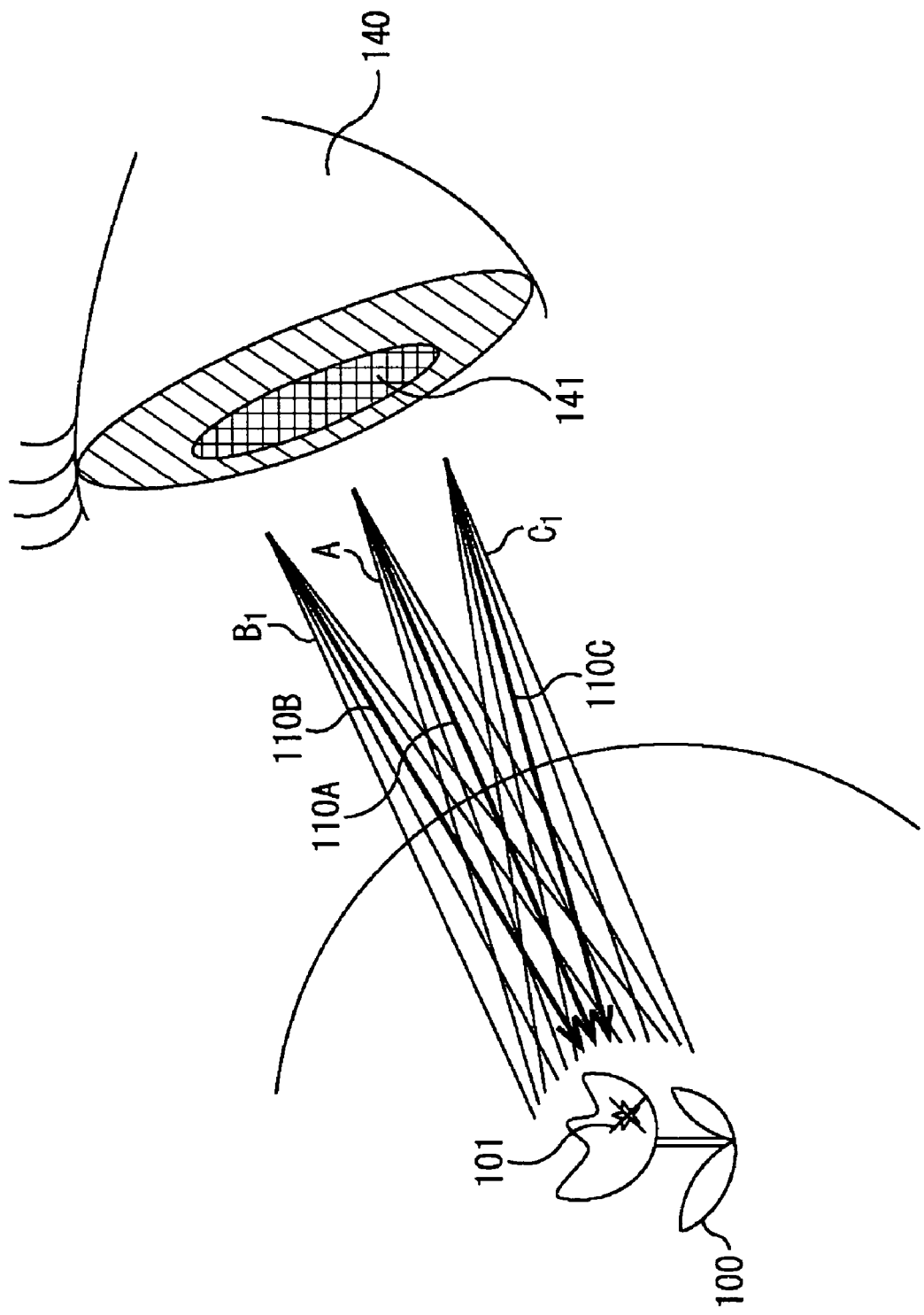
FIG. 11 is an illustration of groups of rays incident on a human eye.

This is described in more detail with reference to FIG. 11. FIG. 11 shows a state in which a human eye 140 observes the point of interest 101 on the subject 100. In the human eye 140, rays of light incident on a pupil 141 having a predetermined pupil diameter are focused. This causes the human eye 140 to observe an image having the subject 100 (point of interest 101).

At this time, rays of light from various angles are incident. For example, a group A of rays based on a ray 110A traveling to the point of interest 101 through the point of interest 101, a group B of rays based on a ray 110B traveling to the point of interest 101 through an upper end of the pupil 141, and a group C1 of rays based on a ray 110C traveling to the point of interest 101 through a lower end of the pupil 141 are incident on the pupil 141 and are combined. In other words, since the human eye 140 is not a pinhole but has a certain dimension (diameter), when the human eye 140 views the point of interest 101, it observes a blurred image (image having a depth of field) in which the periphery of the point of interest 101 is blurred.

Similarly thereto, by combining images (groups of rays) captured from plural points (positions), a natural image that is similar to that viewed by the human eyes can be displayed.

An image display process of the image processing apparatus 1 shown in FIG. 1 is described below with reference to the flowchart shown in FIG. 12.

In step S31, the sensor control unit 41 acquires the position of the user based on the output from the receiver 4. Specifically, the receiver 4 receives the signal output by the transmitter 5, detects its position relative to the transmitter 5, and outputs the detected position as an input to the sensor control unit 41. The sensor control unit 41 acquires the position of the user based on this input. This acquires, from the image database 2, the image data items required for generating an image having a depth of field.

Details of the process for adjusting depth of field in step S32 are described below with reference to FIG. 13.

Figure 14C:
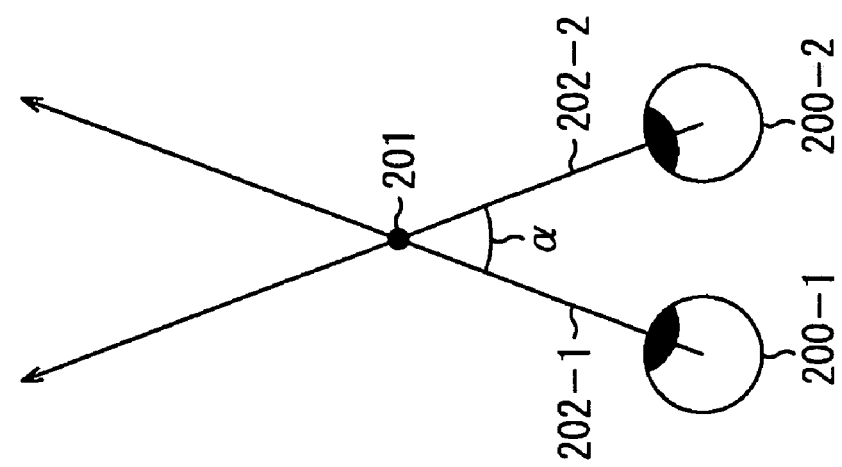
FIGS. 14A, 14B, and 14C are illustrations of an angle of convergence.
Figure 14B:
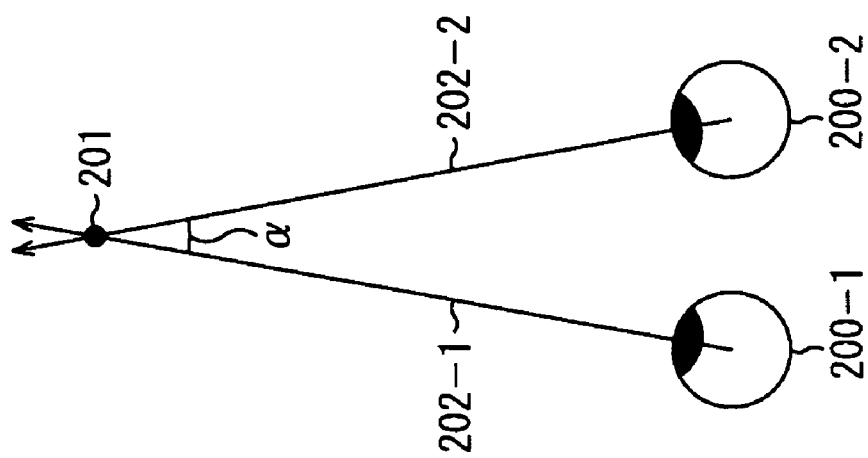

In step S51, the depth-of-field adjusting unit 42 determines a point of interest by using the sensor control unit 41 to acquire the information output from the focal position sensor 3. The focal position sensor 3 outputs an angle of convergence by detecting movement of the user's eyes. The angle of convergence is an angle obtained since a person revolves eyeballs so that there is a difference between a focal position obtained when the person looks far and a focal position obtained when the person looks near. Examples of the angle of convergence are shown in FIGS. 14A to 14C.

Figure 14A:
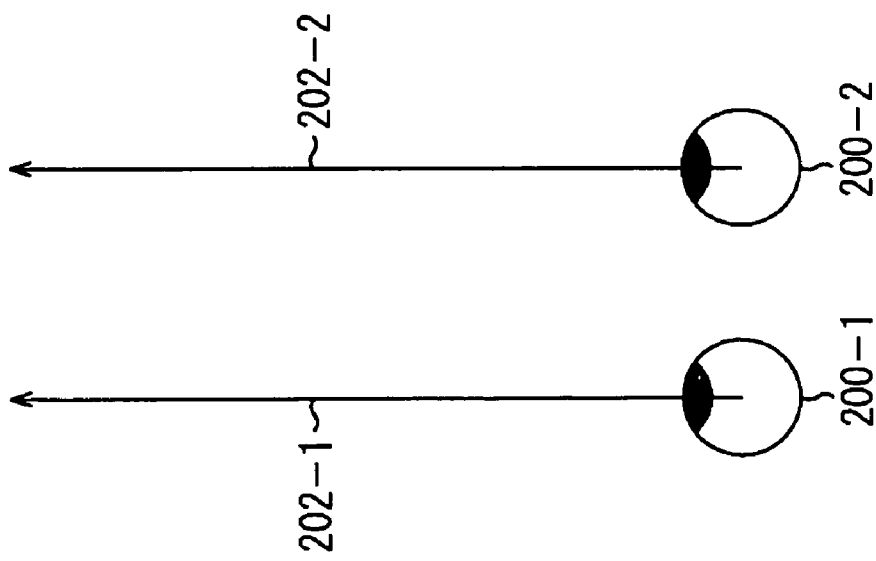

FIG. 14A shows an angle of convergence obtained when a person views a point at infinity, which is a sufficiently far position. In this state, the center line 202-1 of the pupil (black portion) of a left eye 200-1 and the center line 202-2 of the pupil (black portion) of a right eye do not cross. On the contrary, FIG. 14B shows an angle of convergence obtained when the person views a point at a distance of two meters. The center line 202-1 of the pupil of the left eye 200-1 and the center line 202-2 of the pupil of the right eye 200-2 cross at a point 201 at a distance of two meters (from the person). FIG. 14C shows an angle of convergence obtained when the person views a point at a distance of one meter. The center line 202-1 of the pupil of the left eye 200-1 and the center line 202-2 of the pupil of the right eye 200-2 cross at a point 201 at a distance of one meter.

As an apparatus for detecting an angle of convergence, for example, an eyemark® recorder produced by Nac Image Technology, Inc., (in Japan) can be used.

As described above, an angle α of convergence, formed by the center line 202-1 of the pupil of the left eye 200-1 and the center line 202-2 of the pupil of the right eye 200-2, differs depending on the distance between the person and the point the person views. The angle α of convergence obtained when the person views the point at a distance of two meters is called a "0.5-meter (½-meter) angle". The angle α of convergence obtained when the person views the point at a distance of one meter is called a "1-meter" (1/1-meter) angle. The angle α of convergence obtained when the person views the point at infinity is called a "0-meter (1/∞-meter) angle".

Referring back to FIG. 13, in step S52, the depth-of-field adjusting unit 42 may set a depth of field. As described above, the depth of field may be set to a predetermined value or may be set each time in accordance with designation by the user. When the depth of field is large, that is, when an image (close to a pan-focus image) which has a small number of blurred portions is generated, the number of image data items to be combined decreases. When the depth of field is small, that is, when an image having many blurred portions is generated, the number of image data items to be combined increases.

Figure 15A:
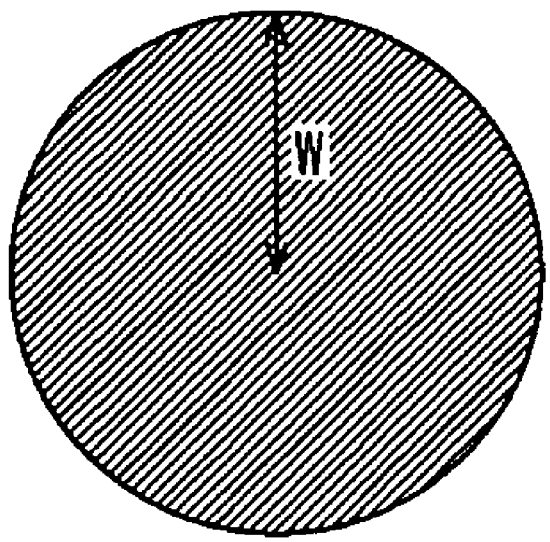
FIGS. 15A and 15B are illustrations of a lens aperture.
Figure 15B:
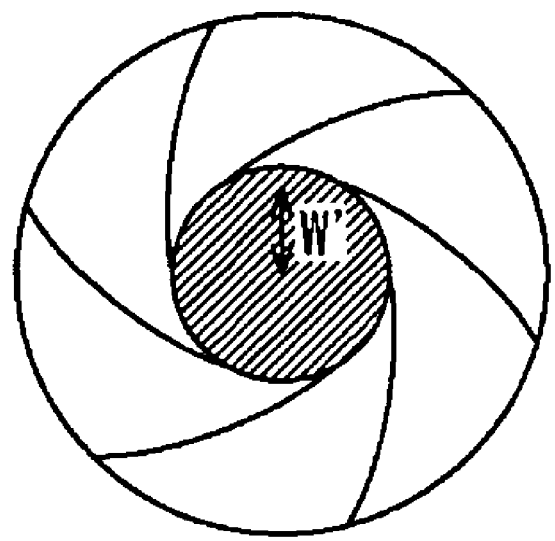

This is similar to, for example, adjustment of a camera lens aperture. FIGS. 15A and 15B show a circular lens aperture. FIG. 15A shows a state in which the lens aperture is fully open. The effective radium of the lens is indicated by reference letter W. FIG. 15B shows a state in which the lens aperture is reduced so that the effective radius W of the lens is the radius indicated by reference letter W'. As described above, for displaying an image, the lens focuses incident rays from the hatched portion. As the lens aperture is more reduced, the lens becomes close to a pinhole, and an image (close to a pan-focus image) having a large depth of field is generated.

Figure 16A:
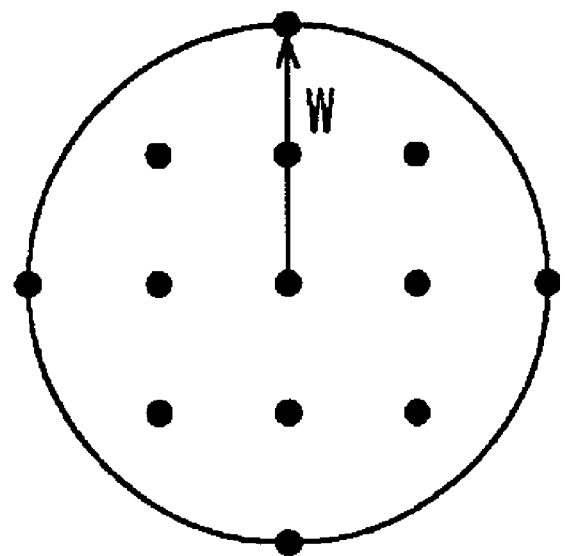
FIGS. 16A and 16B are illustrations of a relationship between a lens aperture and a position at which an image is captured.
Figure 16B:
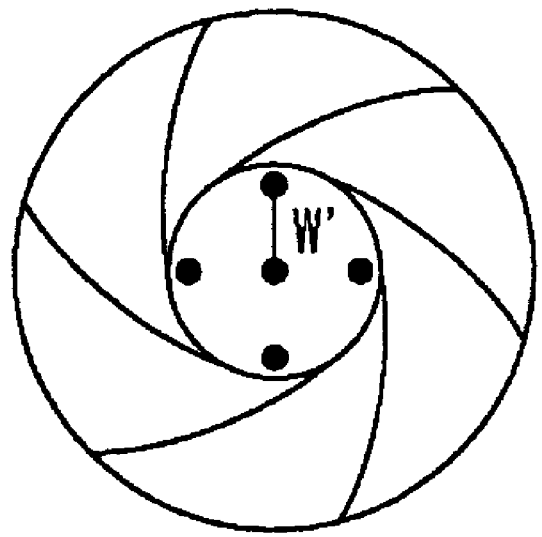

FIGS. 16A and 16B illustrate the above phenomenon by using an image based on image data obtained (captured) at plural positions. Assuming that pan-focus images are captured beforehand at the points indicated by the black dots in FIG. 16A, as shown in FIG. 16A, when the lens aperture is fully opened, that is, when the depth of field is small, by combining the thirteen points (black dots) shown in FIG. 16A, a desired image can be generated. Also, when the depth of field is large, as shown in FIG. 16B, the lens aperture can be reduced. Accordingly, by combining image data of images captured from the five points (black dots) shown in FIG. 16B, a desired image can be generated.

Referring back to FIG. 13, in step S53, the depth-of-field adjusting unit 42 acquires image data to be combined from the image database 2, and outputs the image data to the image combining unit 43.

For example, as shown in the plan view of FIG. 17, when there are a subject 251 (tree) and a subject 252 (flower) as subjects in an image, the point of interest determined in step S51 is a point on the flower which is near the camera 81 (user's eyes), and the depth of field set in step S52 is small (fully-opened lens aperture state), image data of images obtained (captured) at the points A to E shown in FIG. 17 is read.

Figure 18:
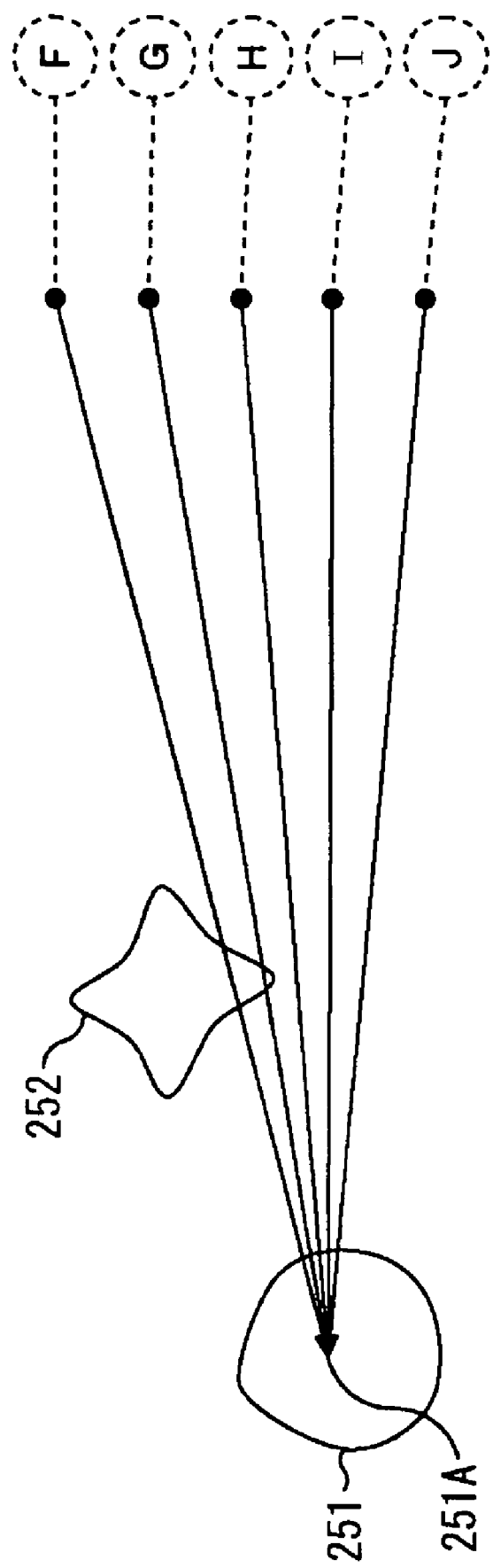
FIG. 18 is a plan view illustrating the plural image capturing positions required for generating a combined image having a depth of field.

In addition, as shown in the plan view of FIG. 18, when the point of interest determined in step S51 is a point 251A on the subject 251 (tree) which is far from the camera 81 (user's eyes), the depth of field set in step S52 is small (fully-opened lens aperture state), image data of images obtained (captured) at the points F to J shown in FIG. 17 is read.

Moreover, as shown in the plan view of FIG. 19, when the point of interest determined in step S51 is a point 252A on the subject 252 (flower), and the depth of field set in step S52 is large (reduced lens aperture state), image data of images obtained (captured) at the points B to D shown in FIG. 17 is read. Unlike the case shown in FIG. 17, in this case, since the depth of field is large, image data of images from a smaller number of viewpoints is read.

As described above, image data is read depending on a point of interest and a depth of field.

After step S53 in FIG. 13, the process proceeds to step S33 in FIG. 12, and the image combining unit 43 executes an image combining process.

Details of the image combining process in step S33 in FIG. 12 are described below with reference to FIG. 20.

In step S71, the image combining unit 43 adds up the image data read by the depth-of-field adjusting unit 42 in step S53. Corresponding pixel levels are added up. In step S72, the image combining unit 43 calculates the average of pixel levels in an image based on the image data added up in step S71. In step S73, the image combining unit 43 displays a display image based on the pixel levels calculated in step S72.

Examples of images displayed are described below with reference to FIGS. 21A to 21F, FIGS. 22A to 22F, and FIGS. 23A to 23D.

FIGS. 21A to 21F show an example of image combining in a case (the case shown in FIG. 17) in which the point of interest is the point 252A on the subject 252 (flower) and the depth of field is small. The images 281A to 281E shown in FIGS. 21A to 21E correspond to items of the image data obtained (captured) at the points A to E shown in FIG. 17 (plan view). The images are superimposed on one another (added up), with the straight line passing through the point of interest 252A as a reference.

The images 281A to 281E are obtained (captured) at different points. Thus, the in-image relationship (distance) between the subjects 251 and 252 differs. For example, the image 281A has a large portion in which the subject 252 (flower) and the subject 251 (tree) overlap with each other. In the order from the image 281B to the image 281D, the portion in which the subject 252 (flower) and the subject 251 (tree) overlap with each other gradually narrows. In the image 281E, subject 252 (flower) and the subject 251 (tree) do not substantially overlap with each other.

Figure 21A:
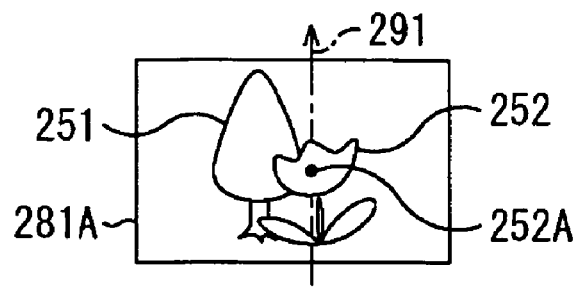
FIGS. 21A, 21B, 21C, 21D, 21E, and 21F are illustrations of an example of combining images captured from the image capturing positions shown in FIG. 17 to generate an image from an anterior view.
Figure 21B:
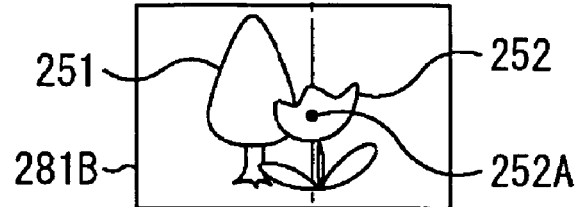
Figure 21C:
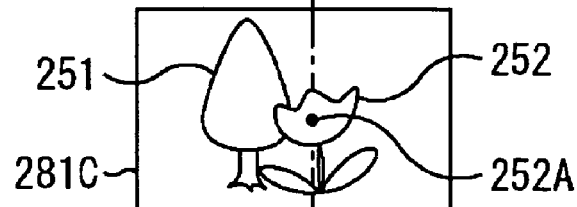
Figure 21D:
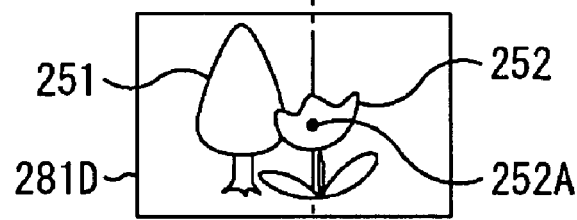
Figure 21E:
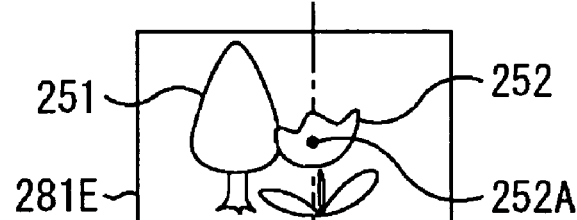
Figure 21F:
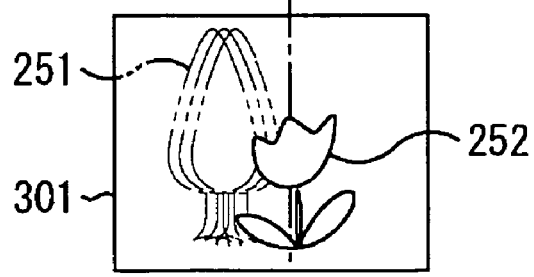
Figure 22A:
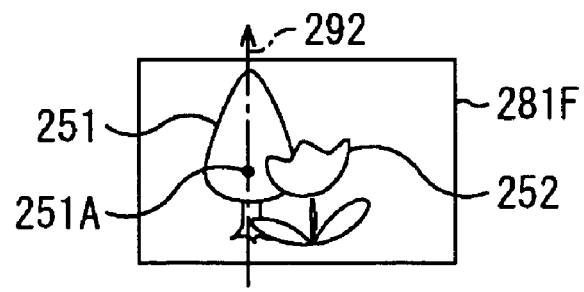
FIGS. 22A, 22B, 22C, 22D, 22E, and 22F are illustrations of an example of combining images captured from the image capturing positions shown in FIG. 18 to generate an image from an anterior view.
Figure 22B:
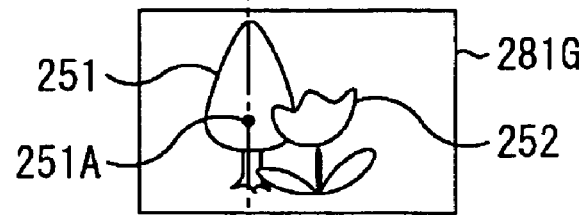
Figure 22C:
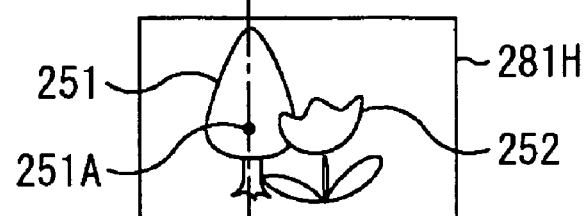
Figure 22D:
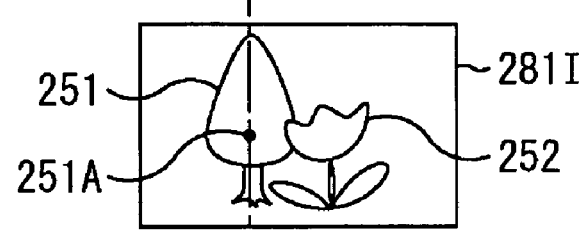
Figure 22E:
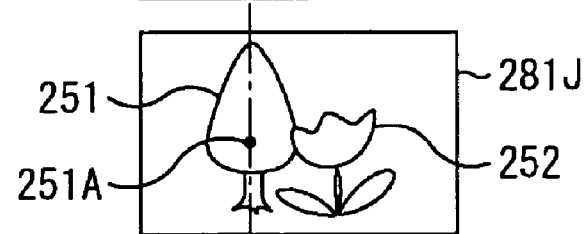
Figure 22F:
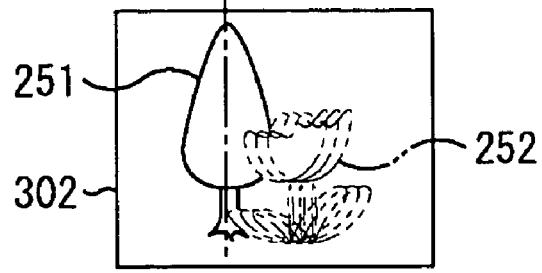
Figure 23A:
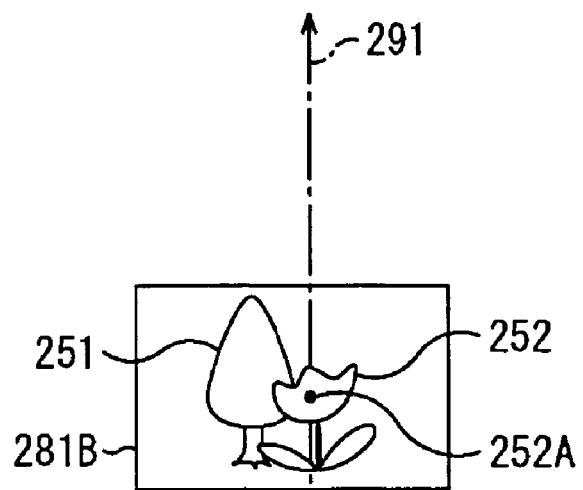
FIGS. 23A, 23B, 23C, and 23D are illustrations of an example of combining images captured from the image capturing positions shown in FIG. 19 to generate an image from an anterior view.
Figure 23B:
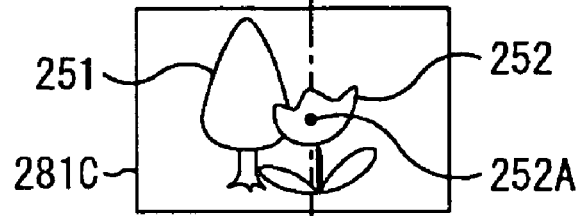
Figure 23C:
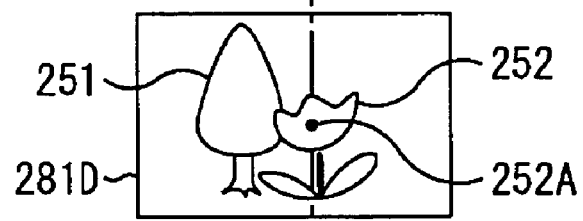
Figure 23D:
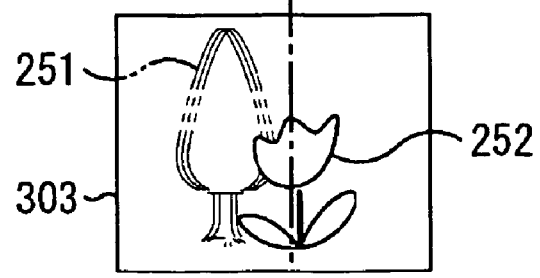

By adding up the images 281A to 281E and displaying an image based on the averages of pixel levels, the image in FIG. 21F is obtained as a display image 301. In this example, the subject 252 (flower) including the point of interest 252A is unblurred, and the subject 251 (tree) behind the subject 252 is blurred.

Similarly, FIGS. 22A to 22F show an example of combining images (images from an anterior view) in which the point of interest is a point 251A on a subject 251 (tree) and the depth of field is small (the case in FIG. 18). The images 281F to 281J shown in FIGS. 22A to 22E correspond to image data items obtained (captured) at the points F to J shown in FIG. 18. The images 281F to 281J are superimposed on one another (added up), with the straight line passing through the points 252A of interest as a reference.

By adding up the images 281F to 281J and displaying an image based on the averages of pixel levels, the image 22F is obtained as a display image 302. In this example, the subject 251 (tree) including the point 251A of interest is unblurred, and the subject 252 (flower) in front of the subject 251 is blurred.

FIGS. 23A to 23D show an example of combining images (images from an anterior view) in a case in which the point of interest is a point 252A on a subject 252 (flower) and the depth of field is large (in the case in FIG. 19). Since this example has a large depth of field, unlike the example in FIGS. 21A to 21F, images 281B to 281D are added up to generate the image (shown in FIG. 23D) as a display image 301. Similarly to the display image 301 in FIG. 21F, in the display image 303 in FIG. 23D, the subject 252 (flower) including the point 252A of interest is unblurred, and the subject 251 (tree) behind the subject 252 is blurred. Compared with the display image 301, the subject 251 (tree) is less blurred and the depth of field is large.

As described above, each display image is displayed. As described above, images based on image data items obtained at plural positions, which are stored beforehand, are combined and the combined image is displayed. Even if the user is at any position, a realistic image having a natural depth of field can be displayed. Also, by adjusting the depth of field, a subject to be of interest can be displayed clearly (in unblurred form).

In FIG. 11, a case in which the ray groups A, B1, are C1 are incident on the pupil 141, thus causing human eyes to observe an image having a depth of field, has been described. There are actually those different from the above ray groups A, B1, and C1.

Figure 24:
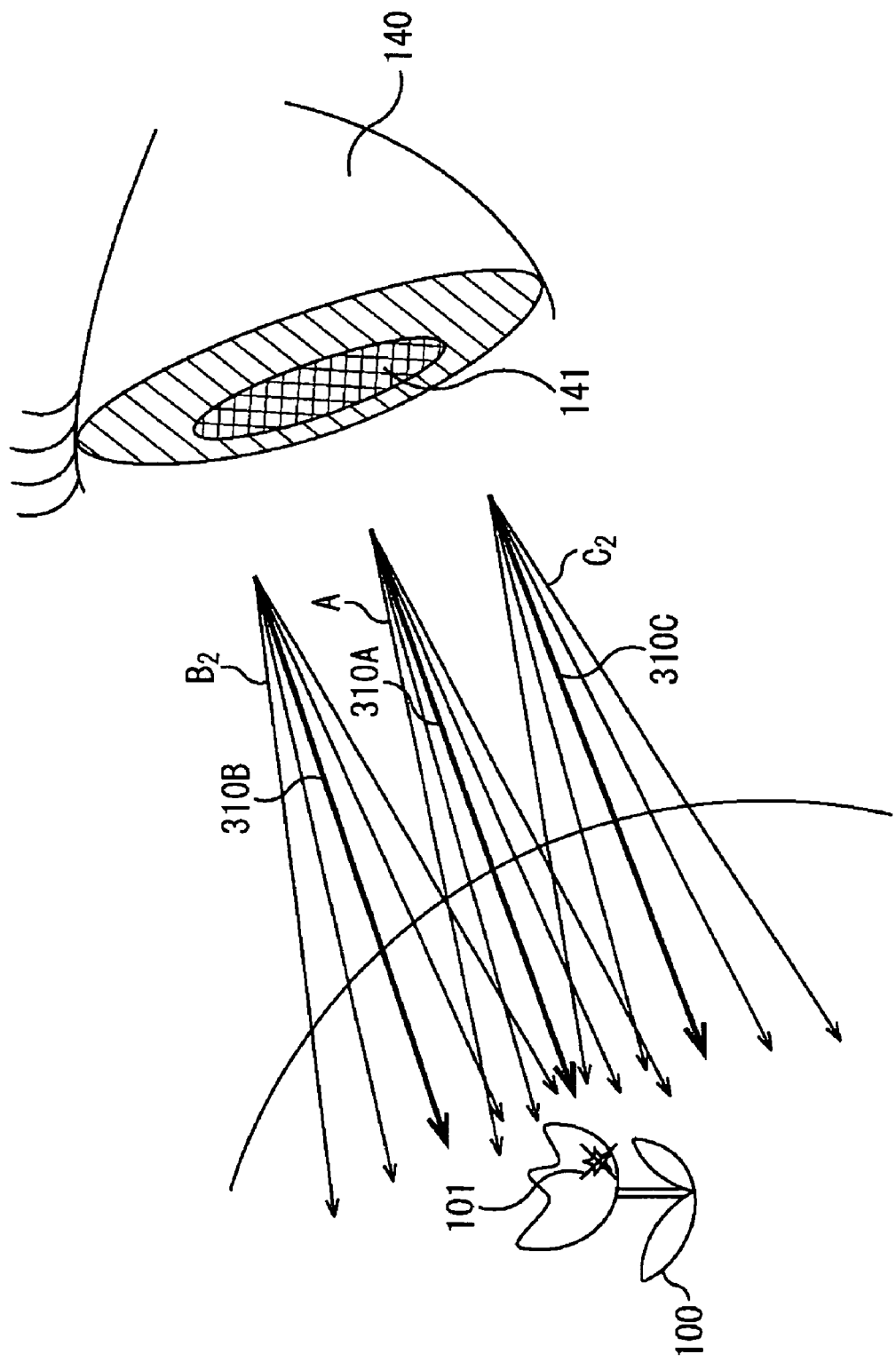
FIG. 24 is an illustration of other examples of groups of rays incident on a human eye.

FIG. 24 is an illustration of other groups of rays incident on the pupil 141 of the human eye 140. Similarly to FIG. 11, FIG. 24 shows a group A of rays passing through the center of the pupil 141, a group B2 of rays passing through an upper end of the pupil 141, and a group C2 of rays passing through a lower end of the pupil 141. The group A of rays in FIG. 24 is based on a ray 310A passing through the center of the pupil 141 to the point 101 of interest similarly to the group A of rays in FIG. 11. However, the group B2 or C2 of rays in FIG. 24 differs from the group B1 or C1 of rays in FIG. 11. In other words, the ray 110B or 11C in FIG. 11, which is the center of the group B1 or C, travels through the upper or lower end of the pupil 141 to the point 101 of interest. Conversely, in FIG. 24, the centrally ray 310B or 310C of the group B2 or C2 of rays is in parallel to the ray 310A.

Therefore, by combining images corresponding to the ray groups A, B2, and C2, a blurred image (having a depth of field) in which the periphery of the point 101 of interest is blurred can be displayed similarly to a case viewed by human eyes.

Figure 25A:
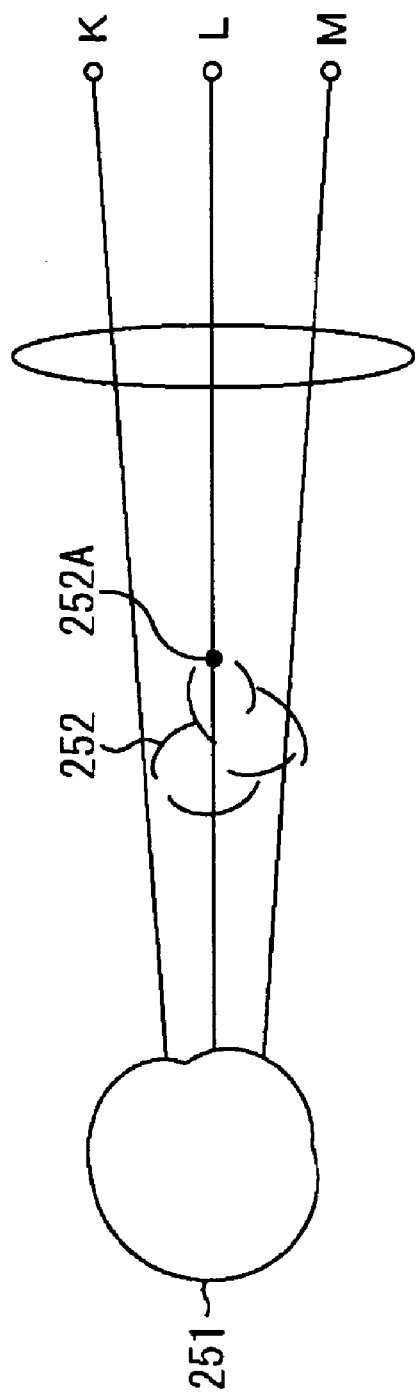
FIGS. 25A and 25B are illustrations of the required plural image capturing positions for generate a combined image having a depth of field.
Figure 25B:
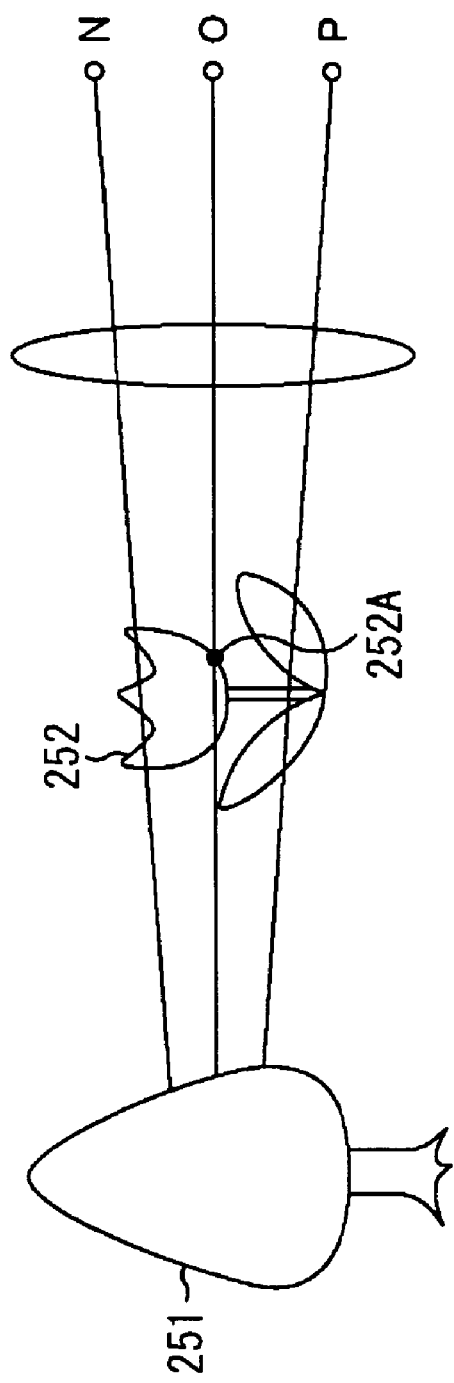

In this case, images captured from the positions shown in FIGS. 25A and 25B are stored in the image database 2, and are combined by the computer 7. FIG. 25A is a plan view showing that a horizontal position K, L, or M at which a subject 251 (tree) and a subject 252 (flower) are photographed is viewed from the top of the subject 251 or 252. FIG. 25B is a side view showing that a vertical position N, O, or P from which the subjects 251 and 252 are photographed is viewed from the side.

Accordingly, the subjects 251 and 252 are photographed at the horizontal position K from the three vertical positions, N (hereinafter referred to as "KN"), O (hereinafter referred to as "KO"), and P (hereinafter referred to as "KP"). Similarly, the subjects 251 and 252 are photographed from three positions (LN, LO, and LP) at the horizontal position L, and are photographed from three positions (MN, MO, and MP) at the horizontal position M.

Figure 26:
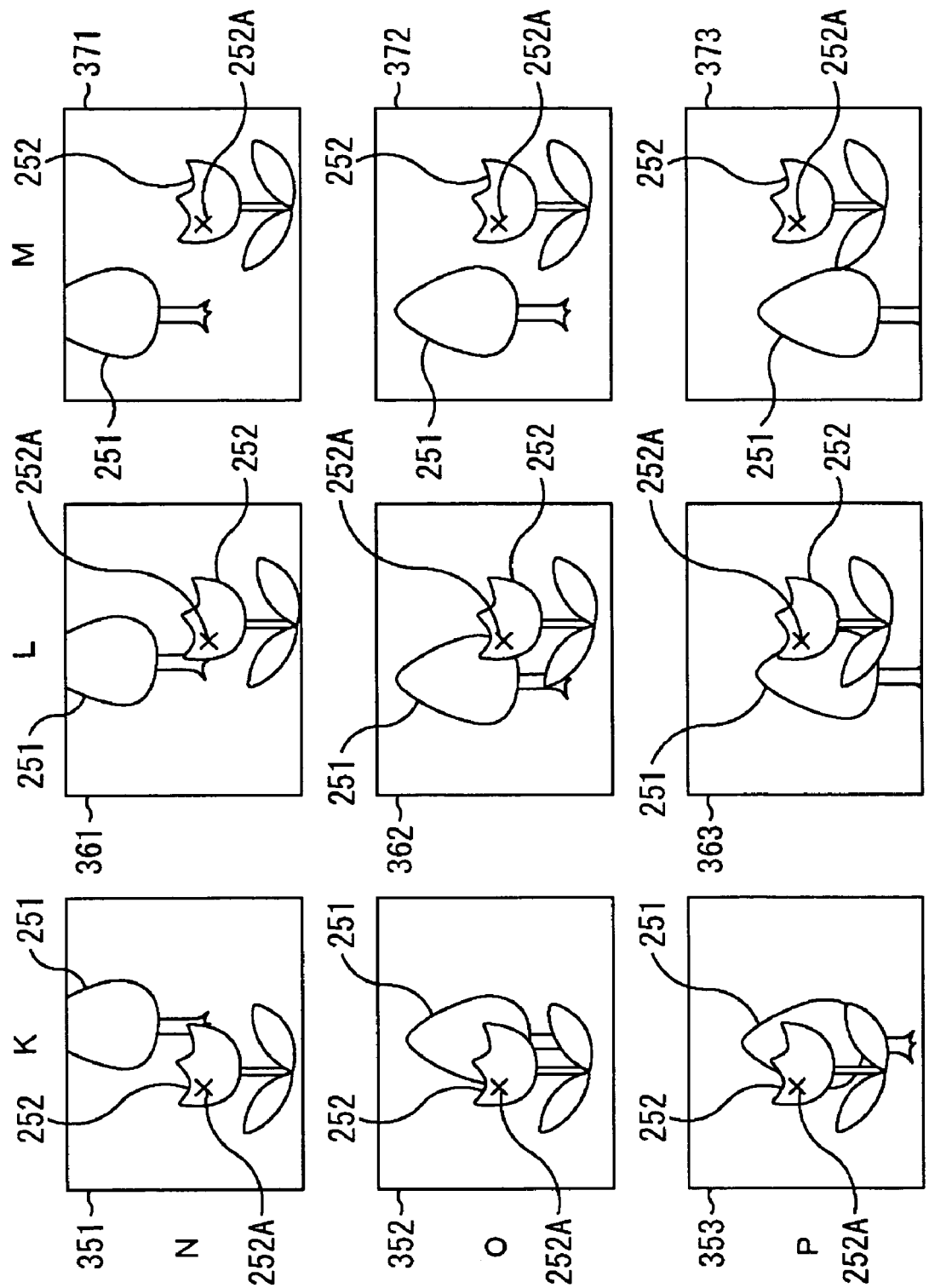
FIG. 26 consists of examples of images captured from the image capturing positions shown in FIGS. 25A and 25B.

The thus captured images are the nine images 351 to 373 shown in FIG. 26. The images 351 to 353 are captured from positions KN, KO, and KP, respectively. The images 361 to 363 are captured from positions LN, LO, and LP, respectively. The images 371 to 373 are captured from positions MN, MO, and MP, respectively.

In FIG. 26, the image 362 is captured from position LO. Thus, the image 362 includes a group of rays based on a ray traveling from the center of the camera lens to the point 252A of interest on the subject 252 (flower), and the point 252A of interest is positioned in the center of the image 362. Conversely, in the image 361 or 363, the point 252A of interest is in a lower or upper position compared with the image 362. Also, in the images 351 to 353, the point 252A of interest is in a slightly left position compared with the images 361 to 363. In the images 371 to 373, the point 252A of interest is in a slightly right position compared with the images 361 to 363.

When these images are combined by the image combining process described with reference to FIG. 20, in step S71, the image combining unit 43 adds up (image data of) the images 351 to 373 so that the points 252A of interest in the images 351 to 373 are superimposed on one another. In step S72, the image combining unit 43 calculates the average of pixel levels of each image added up in step S71. In step S73, the image combining unit 43 displays a display image based on the pixel levels calculated in step S72. As a result, in the displayed image, similarly to the image 301 shown in FIG. 21, the subject 252 (flower) including the point 252A of interest is unblurred, and the subject 251 (tree) behind the subject 252 is blurred.

As described above, by combining the images 351 to 373 shown in FIG. 26, a pan-focus image can be generated as a display image having a predetermined depth of field, similarly to the above cases described with reference to FIGS. 21A to 21F, FIGS. 22A to 22F, and FIGS. 23A to 23D.

The examples described with reference to FIGS. 21A to 21F, FIGS. 22A to 22F, and FIGS. 23A to 23D are close to the case of movement of the pupils of human eyes viewing a point of interest. Thus, these examples are suitable for displaying an image having a natural depth of field corresponding to an angle of convergence of the human eyes. Unlike these examples, in the example described with reference to FIG. 26, the diameter of a pupil of a human eye is, so to speak, a virtual enlarged diameter. Accordingly, this example is suitable for cases such as a case in which, in a displayed image, only a subject at a distance of one meter is focused for clear display and the other portions are blurred on purpose so as to be hidden.

The above-described consecutive processing may be realized by hardware or software. When software is used to realize the above-described consecutive processing, a program forming the software is installed from a network (not shown) or the removable recording medium 21 connected by the communication unit 18 to the computer 7 or the like.

In this specification, steps for executing the above-described consecutive processing include, not only steps executed in a time-series manner in given order, but also steps executed in parallel or separately.

According to the present invention, a realistic image can be provided. In particular, depending on a user's viewpoint, a more realistic image can be provided.

The present application contains subject matter related to Japanese Patent Application No. 2004-034857, filed in Japanese Patent Office on Feb. 12, 2004, the entire contents of which being incorporated herein by reference.

What is claimed is:

1. An image processing apparatus for displaying an image, comprising:
   storage means for storing image data obtained by capturing a plurality of images of a subject from a plurality of positions, together with information of the positions from which the images are captured;
   viewpoint position detecting means for detecting a position of a viewpoint of a user viewing said image;
   focal position detecting means for detecting a focal position of the viewpoint of the user;

setting means for setting a depth of field of the image to be displayed for the user;

reading means for reading a plurality of image data items from said storage means based on the position of the viewpoint detected by said viewpoint position detecting means, the focal position detected by said focal position detecting means, and the depth of field set by said setting means;

combining means for combining the plurality of image data items read by said reading means; and display means for displaying a combined image based on the plurality of image data items combined by said combining means.

2. The image processing apparatus according to claim 1, wherein:

the image data stored in said storage means is image data of unblurred images; and said combining means generates a blurred image corresponding to the depth of field set by said setting means by combining the image data of unblurred images.

3. The image processing apparatus according to claim 1, wherein said focal position detecting means detects an angle of convergence based on a movement of eyes of the user, and detects the focal position based on the detected angle of convergence.

4. The image processing apparatus according to claim 1, wherein a smaller the depth of field is, a more number of image data items said reading means reads from said storage means.

5. An image processing method for an image processing apparatus for displaying an image, said image processing method comprising the steps of:

storing image data obtained by capturing a plurality of images of a subject from a plurality of positions, together with information of the positions from which the images are captured;

detecting a position of a viewpoint of a user viewing said image;

detecting a focal position of the viewpoint of the user;

setting a depth of field of the image to be displayed for the user;

reading a plurality of image data items from the image data stored in the storage step based on the position of the viewpoint detected in the viewpoint position detecting step, the focal position detected in the focal position detecting step, and the depth of field set in the setting step;

combining the plurality of image data items read in the reading step; and displaying a combined image based on the plurality of image data items combined in the combining step.

6. A recording medium having thereon a recorded program for an image processing apparatus for displaying an image, the program comprising the steps of:

controlling detection of a position of a viewpoint of a user viewing said image;

controlling detection of a focal position of the viewpoint of the user;

controlling setting of a depth of field of the image to be displayed for the user;

controlling reading so that, based on the viewpoint detected in the viewpoint-position-detection control step, the focal position detected in the focal-position-detection control step, and the depth of field set in the setting control step, a plurality of image data items are read from image data obtained by capturing a plurality of images of a subject from a plurality of positions, the image data being stored together with information of the positions from which the images are captured;

controlling combining of the plurality of image data items read in the reading control step; and controlling display of a combined image based on the plurality of image data items combined in the combining control step.

7. An image processing apparatus comprising:

moving means for moving a subject;

image capturing means for capturing an image of the subject moved by said moving means; and output means for outputting image data of the image captured by said image capturing means and information of a position of the subject moved by said moving means in a form in which the image data and the information are associated with each other.

8. The image processing apparatus according to claim 7, wherein:

said moving means moves the subject in units of predetermined distances; and whenever said moving means moves the subject, said image capturing means captures images of the subject from a plurality of positions.

9. An image processing method comprising the steps of:

moving a subject;

capturing an image of the subject moved in the moving step; and outputting image data of the image captured in the image capturing step and information of a position of the subject moved in the moving step in a form in which the image data and the information are associated with each other.

10. A recording medium having thereon a recorded program to be executed by a computer, the program comprising the steps of:

controlling movement of a subject;

controlling capturing of an image of the subject moved in the movement control step; and controlling output so that image data of the image captured in the image capturing control step and information of a position of the subject moved in the movement control step are output in a form in which the image data and the information are associated with each other.

11. An image processing apparatus for displaying an image, comprising:

a storage unit configured to store a plurality of image data items obtained by capturing a plurality of images of a subject from a plurality of positions, together with information of the positions from which the images are captured;

a viewpoint position detecting unit configured to detect a position of a viewpoint of a user viewing said image;

a focal position detecting unit configured to set a focal position of the viewpoint of the user;

a setting unit configured to set a depth of field of the image to be displayed for the user;

a reading unit configured to read, from said storage unit, the plurality of image data items based on the position of the viewpoint detected by said viewpoint position detecting unit, the focal position detected by said focal position detecting unit, and the depth of field set by said setting unit;

a combining unit configured to combine the plurality of image data items read from said reading unit; and a display unit configured to display a combined image based on the plurality of image data items combined by said combining unit.

12. An image processing apparatus comprising:
a moving unit configured to move a subject;
an image capturing unit configured to capture an image of the subject moved by said moving unit; and
an output unit configured to output image data of the image captured by said image capturing unit and information of a position of the subject moved by said moving unit in a form in which the image data and the information are associated with each other.

* * * * *

UNITED STATES PATENT AND TRADEMARK OFFICE
CERTIFICATE OF CORRECTION

PATENT NO. : 7,221,863 B2
APPLICATION NO. : 11/047751
DATED : May 22, 2007
INVENTOR(S) : Tetsujiro Kondo et al.

It is certified that error appears in the above-identified patent and that said Letters Patent is hereby corrected as shown below:

Column 1, line 29, change "No. 2002-161833" to --No. 2002-161838--

Signed and Sealed this

Twentieth Day of November, 2007

JON W. DUDAS
*Director of the United States Patent and Trademark Office*